US012076780B2

(12) United States Patent
Levi et al.

(10) Patent No.: US 12,076,780 B2
(45) Date of Patent: Sep. 3, 2024

(54) METHOD AND SYSTEM FOR ADDITIVE METAL CASTING

(71) Applicant: Magnus Metal Ltd., Tzora (IL)

(72) Inventors: Roi Levi, Rehovot (IL); Hani Farran, Ramat Gan (IL); Valeriya Frid Zaid, Tel Aviv-Jaffa (IL)

(73) Assignee: Magnus Metal Ltd., Revadim (IL)

( * ) Notice: Subject to any disclaimer, the term of this patent is extended or adjusted under 35 U.S.C. 154(b) by 0 days.

(21) Appl. No.: 17/983,777

(22) Filed: Nov. 9, 2022

(65) Prior Publication Data

US 2024/0149331 A1    May 9, 2024

(51) Int. Cl.
| | |
|---|---|
| *B22C 9/06* | (2006.01) |
| *B22C 3/00* | (2006.01) |
| *B22F 10/22* | (2021.01) |
| *B22F 10/64* | (2021.01) |
| *B22F 10/68* | (2021.01) |

(Continued)

(52) U.S. Cl.
CPC ............... *B22C 9/061* (2013.01); *B22C 3/00* (2013.01); *B22F 10/22* (2021.01); *B22F 10/64* (2021.01); *B22F 10/68* (2021.01); *B22F 12/224* (2021.01); *B33Y 10/00* (2014.12); *B33Y 80/00* (2014.12)

(58) Field of Classification Search
CPC . B22C 9/061; B22C 3/00; B22F 10/22; B22F 10/64; B22F 10/68; B22F 12/224; B33Y 10/00; B33Y 80/00
See application file for complete search history.

(56) References Cited

U.S. PATENT DOCUMENTS

| | | |
|---|---|---|
| 9,440,397 B1 | 9/2016 | Fly |
| 2002/0108733 A1 | 8/2002 | Prat |

(Continued)

FOREIGN PATENT DOCUMENTS

| | | | |
|---|---|---|---|
| JP | 2015532209 A | * | 9/2015 |
| WO | 2021/015626 A1 | | 1/2021 |

OTHER PUBLICATIONS

JP-2015532209-A, Bartels et al., machine translation. (Year: 2015).*

(Continued)

*Primary Examiner* — John A Hevey
(74) *Attorney, Agent, or Firm* — Kilpatrick Townsend & Stockton LLP

(57) ABSTRACT

A mold construction system is presented for use in additive manufacturing of a metal object. The system comprises: at least one mold provision device controllably operable to form one or more mold regions defining one or more respective object regions in a production layer, and configured to receive molten metal deposited to each object region; and a control system operating said at least one mold provision device in accordance with a predetermined building plan. The mold provision device is controllably operable, in accordance with said predetermined building plan, to create each mold region, in each production layer, with one or more metal-facing zones and one or more metal-nonadjacent zones around the metal-facing zone. Each metal-facing zone is configured to define a cavity forming the object region to receive the molten metal therein, and is configured with higher compressibility relatively to at least a sub-zone of the metal-nonadjacent zone.

29 Claims, 16 Drawing Sheets

(51) Int. Cl.
  *B22F 12/00*  (2021.01)
  *B33Y 10/00*  (2015.01)
  *B33Y 80/00*  (2015.01)

(56) References Cited

U.S. PATENT DOCUMENTS

2004/0216860 A1   11/2004   Pfeifer et al.
2020/0206810 A1*  7/2020    Lavi .................. B22F 10/64
2020/0269320 A1*  8/2020    Ben-Zur ............. B22F 3/15
2021/0031257 A1   2/2021    Homa et al.
2022/0371086 A1   11/2022   Weisz et al.

OTHER PUBLICATIONS

U.S. Appl. No. 17/744,686, filed May 15, 2022, 58 pages; Inventors: Gil Lavi, Boaz Vinogradov, Shimon Sandik, Natalie Levinsohn, Ido Holcman, Oren Gartzman, Emil Weisz; Applicant: Magnus Metal Ltd.

U.S. Appl. No. 17/720,335, filed Apr. 14, 2022, 56 pages; Inventors: Emil Weisz, David Scheiner, Shimon Sandik; Applicant: Magnus Metal Ltd.

U.S. Appl. No. 63/315,096, filed Mar. 1, 2022, 43 pages; Inventors: Gil Lavi and Ido Holcman; Applicant: Magnus Metal Ltd.

Merz, R. et al., Dissertation "Shape Deposition Manufacturing," Vienna Faculty for Electrical Engineering, May 16, 1994, 190 pages.

International Search Report and Written Opinion for Application No. PCT/IL2022/051188, mailed Jul. 12, 2023, 2 pages.

International Search Report and Written Opinion for Application No. PCT/IL2022/051191, mailed Jul. 12, 2023, 3 pages.

U.S. Appl. No. 17/983,806 Restriction Requirement mailed Mar. 24, 2023, 7 pages.

U.S. Appl. No. 17/983,806 Non-Final Office Action mailed Dec. 8, 2023, 17 pages.

* cited by examiner

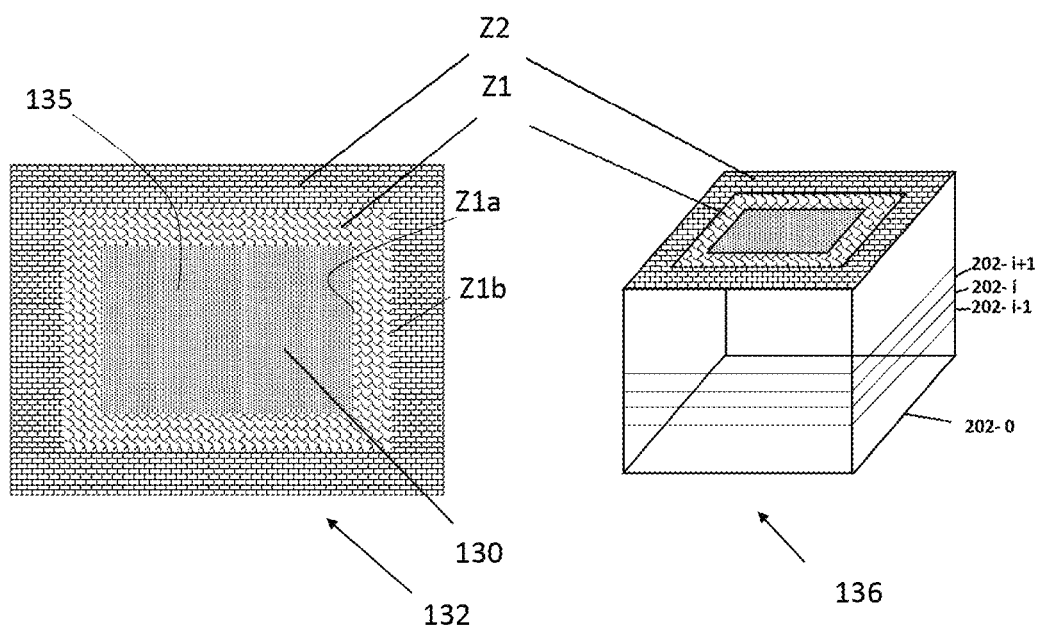

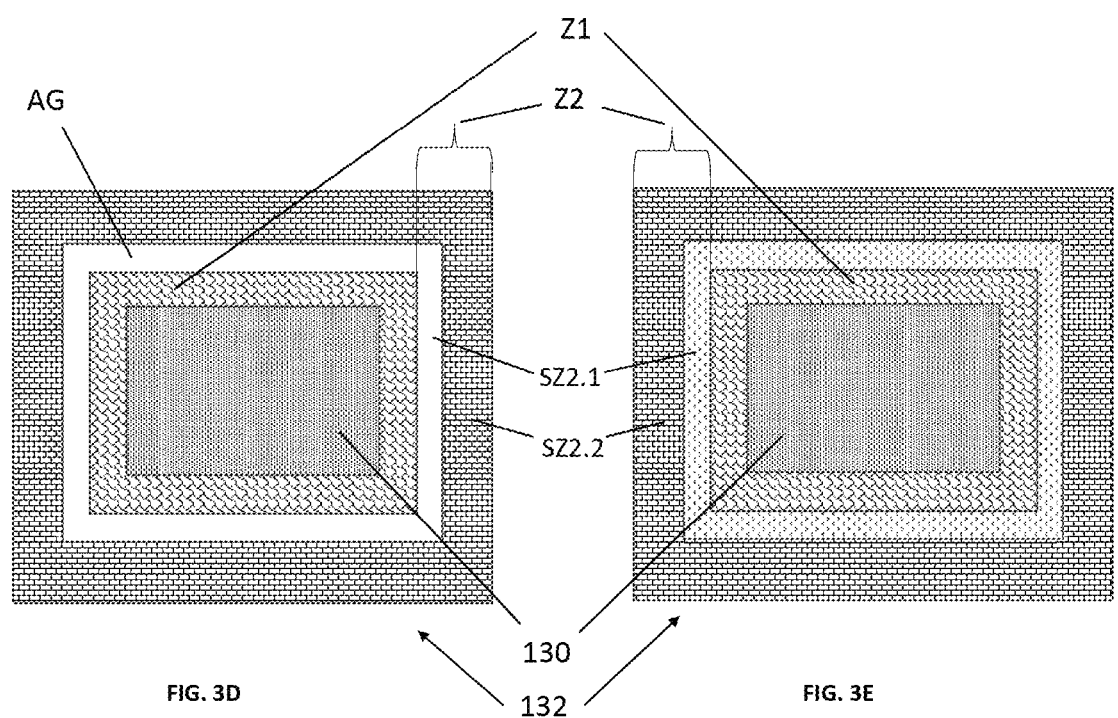

METHOD AND SYSTEM FOR ADDITIVE METAL CASTING

TECHNOLOGICAL FIELD

The technique of the present disclosure is in the field of additive manufacturing of relatively large objects and relates to a method and system for mold construction for additive metal casting.

BACKGROUND AND BACKGROUND ART

Casting is one of the oldest material-forming methods still used today. The principal process had not changed since 3200 BC when bronze was melted and poured into a stone mold. Metal casting is defined as the process in which molten metal is poured into a mold that contains a hollow cavity of a desired geometrical shape and allowed to cool down to form a solidified part.

Most of the world's demand for metal casts is addressed nowadays by traditional casting techniques. While automation solutions are applied, traditional casting involves the global production of molds and the global application of molten metal. For example, additive manufacturing techniques are used for mold fabrication with the implementation of mold curing, sintering, or otherwise mold curing (partially or fully) as a global operation before metal pouring. Molten metal is poured into fully fabricated molds.

Currently available metal additive manufacturing technologies address complex design and low volume applications of relatively small-size parts. Scaling from small parts to large parts of hundreds and thousands Kg. is not trivial. In several currently available metal additive manufacturing technologies, size and weight scaling-up involve part deformation, distortion, shrinking, fracture, cracking, and more.

Despite the advantages of metal additive manufacturing, the associated high cost, low throughput, and scaling-up challenges prevent the adoption of additive techniques for widespread industrial use, especially for manufacturing iron and steel parts.

Casting is widely used for industrial manufacturing of large production quantities and sizable parts in a one-piece cast. Metal casting can produce complex shapes and features like internal cavities or hollow sections can be easily formed. Materials that are difficult or expensive to manufacture using other manufacturing processes can be cast. Compared to other manufacturing processes, existing casting is cheaper for medium to large metal quantities, especially for iron and steel casting.

Modern metal casting also has several disadvantages. Patterns and molds are time-consuming and expensive to make. Additive manufacturing processes, such as, e.g., binder jetting, are typically used to create patterns and molds. However, the fabrication of patterns and molds extend the lead time and limit design flexibility for modifications and adaptations. Additionally, minor post-processing or significant additional post-processing operations are needed for certain applications. Furthermore, metal casting is a hazardous activity, as it involves many elements such as furnaces, molds, cooling areas, and additional tooling that are manually operated and exposed, while operating at very high temperatures.

US Patent Publication No. 2020/0206810, assigned to the assignee of the present application, describes a method and an apparatus for additive casting of parts, wherein the method may include depositing, on a build table, a first portion of a mold, such that, the depositing may be performed layer by layer; pouring liquid substance into the first portion of the mold to form a first casted layer; solidifying at least a portion of the first casted layer; depositing a second portion of the mold, on top of the first portion of the mold; pouring the liquid substance into the second portion of the mold to form a second casted layer, on top of at least a portion of the first casted layer; and solidifying at least a portion of the second casted layer. The method may further include pre-heating each casted layer prior to the pouring of an additional casted layer.

GENERAL DESCRIPTION

There is a need in the art for a novel additive metal casting technique that facilitates high-volume manufacturing with high throughput.

In order to enable high production yield and provide high precision of the casted parts, the mold being produced during the additive metal casting should withstand not only high hydraulic pressure of the molten metal on the mold walls, but also multiple cycles of casted metal heating, which lead to metal expansion, thereby exerting additional pressure onto the mold walls.

As described in the above-mentioned patent publication US2020/0206810, assigned to the assignee of the present application, the additive metal casting can be performed together with additive mold casting. The inventors have identified another problem associated with a need for heating the working area of the object region, to a pre-deposition target temperature needed prior to depositing the metal in the object region. This heating is required to affect bonding of the molten metal with the solidified metal of the preceding metal layers (deposited during previous casting cycles and already cooled down). The pre-deposition target temperature may be below, equal to or above a melting temperature of the metallic object being manufactured. Heating of already solidified metal inside the mold is accompanied by a volume change and exerts pressure on the mold walls during the phase change, causing significant stress inside the mold material and may lead to failures of the mold.

The present disclosure presents a novel mold construction system for use during additive casting of metal objects. The mold construction system provides unique mold regions which are not only configured to define the shape of the metal object, but also to prevent leakage of the molten metal during additive casting, thereby preserving the desired shape of the metal object, increasing thus the casting process yield and safety.

The mold construction system of the present disclosure is configured and operable to produce, in each production layer, one or more mold regions, each associated with (e.g. surrounding) a respective object region being produced in said production layer, where the mold region (e.g. ceramic-based mold region) has at least two zones configured with different mechanical properties such that one of the zones, being metal-facing zone (i.e. directly interfacing the object region) has higher ability to absorb energy of compressive stress than the other which is/are metal-non-adjacent zone(s) surrounding the metal-facing zone. In addition, in some embodiments, the metal-facing zone or a sub-zone of the metal-non-adjacent zone of the mold region has an arrangement of spaced-apart sites of relatively weak mechanical properties relative to their surroundings (spaces between them). This design of the mold region provides even more enhanced stability against molten metal breaches.

It should be noted that according to the present disclosure, additive metal casting includes fabricating a mold structure concurrently with a metal object structure, where this fabrication is implemented in the layer-by-layer additive manner. The layer is termed here a "production layer". Each production layer (in some embodiments, except for a lowermost layer) includes one or more "mold regions" each defining and surrounding a respective "object region" of the metal object structure. The closed-loop mold region in the production layer being fabricated defines a cavity into which the molten metal of the object region is deposited. Typically, the first (lowermost) layer includes the closed-loop mold region and a bottom layer of the cavity made solely out of the mold material.

Thus, in the description below, the term "mold region" refers to the mold part/portion within the single production layer. The terms "mold structure" and "mold" are used interchangeably referring to all or part of the stack of mold regions in all or several production layers.

It should be understood that in the general field of mold fabrication by 3D printing, the term "mold" is commonly used to describe a complete mold structure, fully sintered/cured before metal pouring. The technique of the present disclosure deals with additive fabrication (production layer-by-production layer fabrication) of a stack of mold regions where, within each mold region, additive casting of a respective stack of object regions in the cavity being formed by the respective mold region is performed. In this connection, it should be noted that the mold regions of different production layers may or may not be of the same size and geometry since this depends on the specific geometries and sizes of the respective object regions.

The mold construction system of the present disclosure is configured to fabricate each mold region to receive molten metal in the cavity/object region defined by said mold region before the successive mold region (of the subsequent production layer) is constructed. The mold regions of the different production layers are cured (partially, or not at all) at different points of time during the production process.

Thus, according to one broad aspect of the technique of the present disclosure, there is provided a mold construction system for use in additive manufacturing of a metal object, the mold construction system comprising: at least one mold provision device, which is controllably operable to form one or more mold regions defining one or more respective object regions in a production layer and is configured to receive molten metal deposited to each of said one or more object regions; and a control system configured to operate said at least one mold provision device in accordance with a predetermined building plan, wherein:

said at least one mold provision device is controllably operable, in accordance with said predetermined building plan, to create each mold region, in each production layer, with one or more metal-facing zones and one or more metal-nonadjacent zones around the metal-facing zone, wherein each of the one or more metal-facing zone is configured to define a cavity forming the object region to receive the molten metal therein, and wherein each of the one or more metal-facing zones is configured with higher compressibility relatively to at least a sub-zone of the metal-nonadjacent zone.

The control system is configured to operate the mold provision device in accordance with the building plan which is indicative of two or more of the following: geometric layout of the one or more object regions in each of the production layers; material, geometrical properties and arrangement of the metal-facing and metal-nonadjacent zones of each mold region in each of the production layers; mold deposition process parameters; surface treatment parameters and conditions of surface treatment of the mold region; synchronization data for the mold regions and object regions formation in the production layers.

In some embodiments, the metal-nonadjacent zone of the mold region is configured with higher tensile strength relative to the metal-facing zone of said mold region.

In some embodiments, the metal-facing zone and the metal-nonadjacent zone of the mold region comprise, respectively, first and second different mold material compositions.

In some embodiments, the metal-facing zone is configured as an inner wall made of a refractory compressible ceramic-based material selected to be suitable for said molten metal.

The metal-nonadjacent zone may be composed of ceramic-based material.

In some embodiments, the metal-facing zone comprises a first metal-adjacent sub-zone surrounded by a second outward sub-zone, said first metal-adjacent sub-zone being relatively narrow, at least by a factor of four, as compared to the outward relatively wide sub-zone, such that compressibility of the metal-facing zone formed by the relatively narrow metal-adjacent sub-zone and the relatively wide, compressible outward sub-zone provides said higher compressibility of the metal-facing zone as compared to the metal-nonadjacent zone.

For example, the configuration may be such that the second outward sub-zone of the metal-facing zone is composed of a compressible ceramic-based material, and the first narrow sub-zone of the metal-facing zone is configured as a coating on a metal-facing side of the second outward sub-zone. The compressible ceramic-based material with the refractory coating is with higher compressibility comparing the metal nonadjacent zone.

In some embodiments, a smoothing coating is applied to the metal-facing side of the compressible ceramic-based material. The compressible ceramic-based material with the smoothing coating is with higher compressibility comparing the metal nonadjacent zone.

In some embodiments, the at least one mold provision device is configured and operable to provide the mold region configured such that the metal-facing zone, by a non-metal facing side thereof, is at least partially adhered to the metal-nonadjacent zone. In some other embodiments, the metal-facing zone and the metal-nonadjacent zone are spaced from one another by an air gap.

In some embodiments, the mold region comprises the metal-nonadjacent zone comprising a first sub-zone surrounded by at least a second sub-zone having different mechanical properties as compared to the first sub-zone of the metal-nonadjacent zone. For example, the metal-nonadjacent zone may be composed of a ceramic-based material deposited as a first wall and at least a second wall forming said first and said at least second sub-zones, respectively. In some examples, the first sub-zone of the metal-nonadjacent zone has a shape conforming with a shape of the metal-facing zone and said at least second sub-zone encapsulates the first sub-zone. In some examples, the first sub-zone of the metal-nonadjacent zone interfacing with the metal-facing zone is made of a filler material having higher compressibility relative to the at least second sub-zone of the metal-nonadjacent zone.

In some examples, the first and at least second sub-zones of the metal-nonadjacent zone are spaced by an air gap between them. In some other examples, the metal-nonadjacent zone comprises said first and second sub-zones, and a third sub-zone enclosing the second sub-zone, wherein the second sub-zone between the first and third sub-zones is configured as a filler material having higher compressibility relative to the first sub-zone of the metal-nonadjacent zone.

In some embodiments, the material of at least one of the metal-facing zones and at least one sub-zone of the metal-nonadjacent zones is configured as one or more of the following: compressible sand, ceramic-based material, compressible ceramic-based material, porous ceramics, ceramics by spraying, spheres, negative thermal expansion materials, reversibly compressible plastics, nanostructures, layered materials.

The metal-facing zone may be configured with an arrangement of spaced-apart sites of relatively weak mechanical strength as compared to their surroundings within said metal-facing zone. Such arrangement may be provided by any suitable technology, e.g., provision of sites with relatively high porosity, sites filled/made of material of higher compressibility and/or sites of different geometric properties.

For example, the arrangement of sites of different geometric properties as compared to their surroundings can be implemented by configuring the metal-facing zone or a sub-zone thereof with a varying width along a perimeter thereof to thereby provide a predetermined variation of a mechanical property of said metal-facing zone along its perimeter. The varying width of the metal-facing zone may define the arrangement of spaced-apart sites of relatively weak mechanical strength as compared to their surroundings within said metal-facing zone. For example, the first sub-zone of the metal-nonadjacent zone has a varying width along a perimeter thereof to thereby provide a predetermined variation of the mechanical property of said first sub-zone to thereby define in said first sub-zone an arrangement of spaced-apart sites of relatively weak mechanical strength as compared to their surroundings within said first sub-zone.

In some embodiments, the second outward sub-zone of the metal-facing zone has a varying width along a perimeter thereof to thereby provide a predetermined variation of the mechanical property of said second sub-zone to thereby define in said second sub-zone an arrangement of spaced-apart sites of relatively weak mechanical strength as compared to their surroundings within said first sub-zone. For example, the metal-nonadjacent zone may comprise first and second sub-zones, where said first sub-zone interfacing with the metal-facing zone is an air gap.

In some embodiments, said at least one mold provision device is configured and operable to create the mold region using one or more mold material provision iterations.

In some embodiments, for example, for additively casting gray iron objects, the height of the object region in a production layer may be 1 mm-20 mm, realized in a single or multiple metal deposition iterations. Correspondingly, the height of the mold region may be 1 mm-20 mm. The mold region may be constructed in single or multiple mold deposition iterations. For example, utilizing ceramic-based mold material, a 6 mm height mold region may be constructed by depositing a circular mold tube of 6 mm diameter or two deposition iterations of a circular mold tube of 3 mm diameter. In another example, utilizing binder jetting for mold construction, the mold material deposited in a single iteration may have a thickness of about 100 to 150 microns. Multiple iterations are required for constructing the 6 mm height mold region.

In some embodiments, said at least one mold provision device comprises one or more traveling mold depositors, each traveling in a horizontal plane according to a predetermined trajectory and being associated with one or more mold material reservoirs. For example, said mold provision device may comprise one or more extruders each in fluid communication with said one or more traveling depositors. In some examples, each traveling depositor comprises at least one of the following: stirrers, tubing, and tubing loop configured to perform continuous circulation of the mold material not currently involved in deposition process.

In some embodiments, the at least one mold provision device comprises a mold powder dispenser to provide the mold material in a powder form and a binder jetting dispenser for dispensing one or more binding agents in selected locations. For example, the mold construction system may further comprise a powder removal device for removing the mold powder from locations outside the selected locations.

In some embodiments, the system further comprises a surface treatment system configured and operable to apply one or more surface treatments to the mold material in the mold region.

The surface treatment system may be configured and operable to apply temperature treatment to the mold material in the mold region to harden said mold material. For example, the at least one mold provision device may be configured and operable to create the mold region using one or more mold material provision iterations, the surface treatment system being configured and operable to apply the temperature treatment to the mold region after each of said one or more mold provision iterations.

The surface treatment system may be configured and operable to perform mechanical surface treatment of at least a metal-facing side of the metal-facing zone of the mold region.

In some embodiments, the system is configured and operable to create the mold region of a current production layer on top of either at least a part of a preceding mold region of a preceding production layer or on at least a part of a preceding object region of the preceding production layer, depending on a surface relief of the metal object region being manufactured.

The technique of the present disclosure, in its another aspect, provides a production part comprising: a stack of production layers, each of the production layers comprising: one or more object regions of a metal object, each object region being surrounded by a mold region having at least one metal-facing zone each surrounded by a metal-nonadjacent zone such that a surface of the metal object in said object region and a facing surface of each of the at least one metal-facing zone of the mold region are physically coupled between them.

The present disclosure, in its yet another broad aspect, presents an additive casting system including the above-described mold construction system, and an object construction device configured and operable to construct each current production layer by depositing molten metal in each of one or more object regions defined by each of the respective one or more mold regions in said current production layer.

The object construction device may comprise one or more molten metal depositors; and a control system configured to operate said one or more molten metal depositors in accordance with a predetermined building plan which is indicative of the following: geometric layout of the one or more object regions in each of the production layers; and synchronization data for the mold regions and object regions formation in the production layers.

In some embodiments, the object construction device is configured and operable to create the object region of a current production layer on top of either at least a part of a preceding mold region of a preceding production layer or on at least a part of a preceding object region of the preceding production layer, depending on a surface relief of the metal object region being manufactured.

The technique of the present disclosure, in it yet further broad aspect, provides a method for use in additive manufacturing of a metal object, the method comprising: constructing successive production layers, each including a number of mold regions associated with a respective number of object regions, wherein the constructing of each production layer is controllably performed in accordance with a predetermined building plan, by carrying out the following: for each production layer, prior to deposition of molten metal material in the number of object regions, creating said number of mold regions, by depositing a mold material in said number of mold regions while varying one or more of mold material deposition parameters and conditions, to construct each mold region comprising one or more metal-facing zones, configured to define a cavity forming the object region to receive the molten metal therein, and one or more metal-nonadjacent zones surrounding said one or more metal-facing zones, wherein said metal-facing zone has higher compressibility relative to the metal-nonadjacent zone.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 2B to 2F illustrate the principles of the mechanism utilized in the technique of the present disclosure for the additive mold construction, wherein FIG. 2B shows typical stress-strain curves of ceramics, metals and polymers; FIG. 2C shows a stress-strain curve of a brittle material under tensile and compressive stresses; FIG. 2D shows a stress-strain curve of a ceramic material more resistant to compression than to tensile stress; FIG. 2E is a schematic diagram showing the pressure exerted by molten metal on the mold wall and the consequent stresses developing within the mold wall; and FIG. 2F shows schematically stress-strain curves corresponding, respectively, to strong, tough and ductile materials;

FIGS. 3A-3B exemplify, respectively, the top view (or cross-sectional view) of the mold region or mold structure, and a perspective view of a mold structure (or a part thereof) in which a metal-facing zone and a metal-nonadjacent zone of the mold region are concentric, and each has a constant thickness thereof;

FIG. 3D exemplifies a mold region in which the metal-facing zone and the metal-nonadjacent zone are spaced by an air gap;

FIG. 3E exemplifies a mold region in which the metal-nonadjacent zone includes first and second sub-zones in direct contact with each other, where the first sub-zone interfacing with the metal-facing zone is formed by a compressible material and located between the metal-facing zone and the second sub-zone of the metal-nonadjacent zone, said compressible mold material having higher compressibility than the mold material of the second sub-zone of the metal-nonadjacent zone;

DETAILED DESCRIPTION OF EMBODIMENTS

The technique of the present disclosure is based on the finding by the inventors that configuring each mold region of each production layer with properly arranged zones, differently spaced from an object region, which have different levels of compressibility provides enhanced stability of the mold region, and thus, the entire mold structure, against molten metal breach in object region surrounded by said mold region. More specifically, each mold region is in the form of at least two zones, i.e., at least one metal-facing zone and at least one metal-nonadjacent zone. The metal-facing zone is configured to define a cavity forming the object region to receive the molten metal therein, and the metal-nonadjacent zone surrounds the metal-facing zone. Each metal-facing zone is configured with higher compressibility (i.e., has a higher ability to absorb energy of compressive stress) relative to at least a sub-zone of the metal-nonadjacent zone. Thus, the metal-facing zone has a higher ability to absorb energy of compressive stress.

The terms "toughness", "compressibility", "tensile strength" used herein will be clarified in detail below to better understand the underlying principles of the present disclosure.

As will be described below, each of the metal-facing zone and metal-nonadjacent zone may or may not include multiple sub-zones of different mechanical properties. In the description below, the zones and sub-zones of the mold region are at times referred to as "walls". Thus, the metal-facing zone and/or metal-nonadjacent zone may have a single-wall configuration or a multi-wall configuration. The metal-nonadjacent zone surrounds the metal facing zone, either directly interfacing with the metal-facing zone or being spaced therefrom by an air gap.

In the following, the term "compressible" with respect to a mold element will be used as a general term indicating the compressibility of a specific wall or section (zone or sub-sone) of the mold region such that this zone/wall/section has higher ability to absorb energy of compressive stress than the other zone/wall/sections of the mold region.

The compressibility of the zones/walls of the mold region can be controlled, inter alia, by using different types of material compositions of the mold material in the different zones/walls or different combinations of material compositions and/or concentrations thereof or by treating the formed layers by various physical or chemical methods, as will be detailed in the following.

Figure 1A:
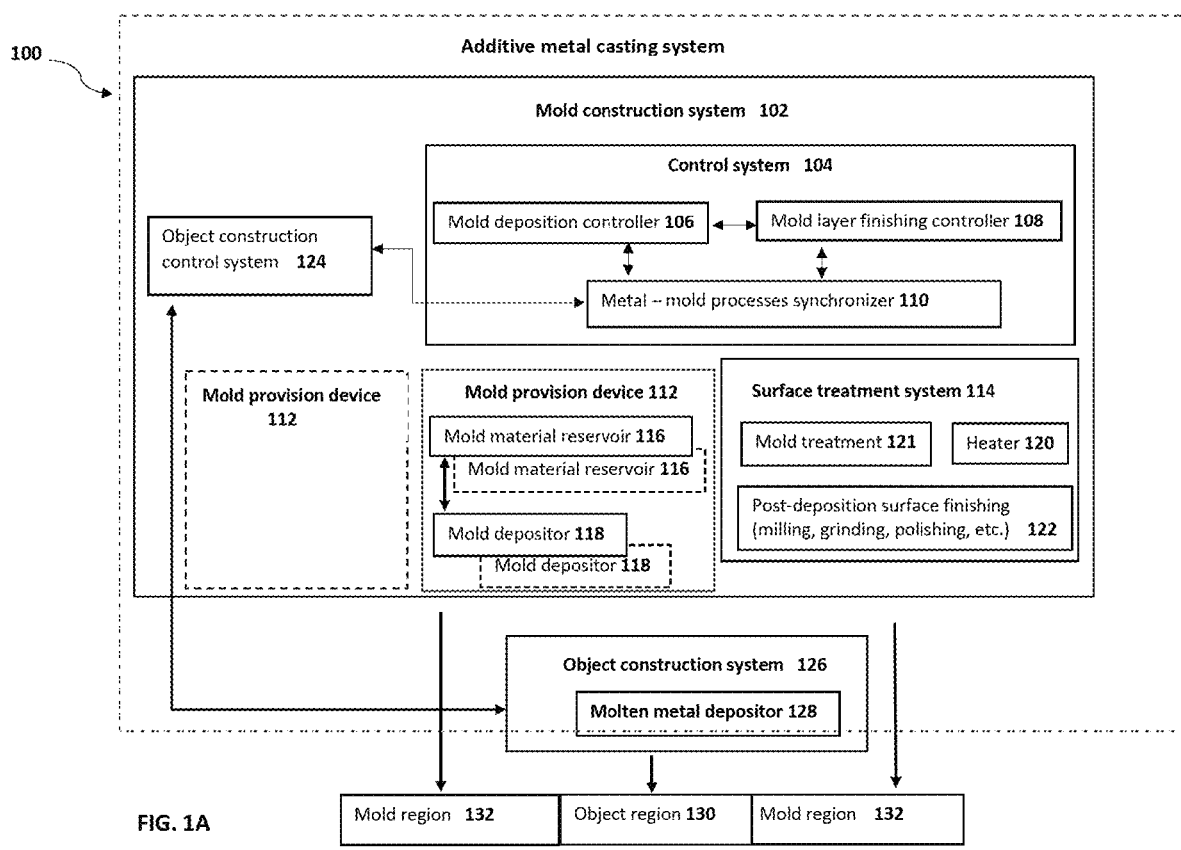
FIG. 1A schematically illustrates, by way of a block diagram, the additive mold construction system of embodiments of the present disclosure.

Reference is made to FIG. 1A which schematically illustrates, by way of a block diagram, a mold construction system 102 configured and operable according to embodiments of the technique of the present disclosure. The mold construction system 102 is typically a part of an additive metal casting system 100 which also includes an object construction system/device 126.

It is to be understood that the construction and operation of the object construction device 126 do not form part of the present disclosure and therefore are not described herein in details, except to note the following: The operation of the mold construction system 102 to layer-by-layer form the mold is properly synchronized with operational cycles of the object construction device 126 (via communication with an object construction control system 124) to additively create production layers, each including metal in an object region 130 surrounded by a mold region 132. It should be understood that the object design defines the number of object regions surrounded by the respective mold regions.

The object construction device is preferably configured and operable as described in the above-mentioned US20200206810, and/or in U.S. patent application Ser. Nos. 17/744,686, 17/748,069, assigned to the assignee of the present application, which are incorporated herein by reference with respect to specific not limiting examples of the object construction device and its associated object construction control system 124.

The mold construction system 102 includes inter alia a control system 104 controlling the operation of one or more mold provision devices 112 and a surface treatment system 114. The control system 104 is a computerized system including inter alia a mold deposition controller 106, a mold layer finishing controller 108, and a metal-mold processes synchronizer circuit 110. The latter is in data communication with the object construction control system 124.

The one or more mold provision devices 112 are controllably operable to deposit mold material to form the mold region 132 defining the object region 130 in a production layer. The object region 130 is configured to receive molten metal being deposited by a molten metal depositor 128.

The mold provision device 112 is configured and operable by the mold deposition controller 106, in accordance with a predetermined building plan of successive formation of multiple production layers. In some embodiments, the mold provision device 112 is configured to construct each mold region 132 in each production layer by performing deposition of variable compositions of the mold material in the metal-facing and metal-nonadjacent zones of the mold region, prior to depositing the molten metal to form the object region 130 of the current production layer. In some embodiments, the mold provision device 112 constructs the mold region by performing one or more mold deposition iterations.

It should be noted that the principles of the technique of the present disclosure for construction of each mold region in each production layer (and thus the entire mold structure) can be performed using both in-situ and ex-situ construction process. In some embodiments of the in-situ process, the mold region(s) of each production layer is/are constructed within the common working area with the object region(s) of the same production layer, and the mold material being deposited is in a green-body state. This process requires proper adhering between the mold regions of neighboring (successively produced) production layers, which require proper control of the mold material properties and surface treatment of each deposited mold region. For example, the in-situ process may utilize deposition of ceramic-based green-state paste. In another example, the in-situ process may utilize a binder jetting procedure, i.e., using a mold powder provision device, a mold binder dispensing device and a mold powder removal device.

In the ex-situ process, the mold unit forming the mold region is constructed in a separate working area and is brought to the working area adjacent to that of the object region by a separate holding/translating unit (e.g., robot). For example, the ex-situ process may utilize a binder jetting procedure, i.e., using a mold powder provision device, a mold binder dispensing device and a mold powder removal device. In another example, the ex-situ process may utilize a stack of frames, each containing a sand-based mold region with or without a replaceable pattern.

In the description below, the technique of the present disclosure is exemplified in relation to the in-situ mold construction utilizing ceramic-based green state paste. However, it should be understood that the principles of the technique of the present disclosure are not limited to this mode of implementation.

The configuration (geometrical and material properties) of the metal-facing and metal non-adjacent zones of the mold region need to be created by mold depositor(s) 118 during the mold deposition, according to the predetermined building plan.

Each mold provision device 112 may include one or more mold material reservoirs 116 connected via feeding line(s) to one or more traveling mold depositors 118. Each mold depositor 118 is driven (by a suitable drive mechanism which is not specifically shown) for movement in a horizontal plane along a predetermined trajectory according to the building plan.

The mold depositor 118 may be of any known suitable configuration, which does not form part of the present disclosure and therefore need not be specifically described except to note the following. Such mold depositor is typically in the form of one or more extruders/print heads, and each is in fluid communication with the one or more mold material reservoirs 116. It should be noted, although not specifically shown, that since the mold material is typically a relatively viscous material, the mold provision device 112 (e.g., traveling mold depositor(s) 118 and/or the feeding line(s)) may include stirrers and/or tubing and/or tubing loop configured to perform continuous circulation of the mold material which is not currently involved in deposition process.

According to some embodiments of the present disclosure, mold materials include mold materials in paste form, powder form, granular form, slurry form, and mold materials mixed with binders, releasing agents, activating agents, UV absorbing particles, crosslinking agents, heat-absorbing particles, or other additives to facilitate mold fabrication and use. According to embodiments of the present disclosure, mold materials include, but are not limited to ceramics (e.g., zirconia, alumina, magnesia, etc.), sand, clay, metallic powders, and any combination thereof.

In the description below, the mold material is at times termed as ceramic-based material, but it should be understood that the principles of the technique of the present disclosure are not limited to this specific example, as well as not limited to any type of mold material. The properties of the mold material being used are taken into account, together with those of the metal material and the building plan, to design the preferred toughness/compressibility of the mold wall as well as to select the optimal number of walls in the mold region.

In some embodiments, two material reservoirs 116 may be used for ceramic-based material. The use of two reservoirs may be favorable to make the mold construction process more efficient in time, when a large reservoir, which may be positioned remotely from the production area, is configured in advance to provide proper wetting for a large amount of ceramic-based material (which requires time) under constant mixing. This large reservoir may be in fluid communication (by pipes) with a smaller reservoir, which may be kept under constant mixing, wherein the smaller reservoir is in connection with the mold depositor 118 and possibly also moved together with the mold depositor 118 on the production table to form the predetermined mold regions 132.

It is noted that in some embodiments, for example where the mold material is in a powder form, the mold provision device 112 may include additional mold depositor(s)/dispenser(s) to successively perform mold material deposition and dispense one or more special binding agents in selected regions via binder jetting process. This process is followed by removal of the mold powder from sites outside these regions.

The mold construction system 102 may further include a surface treatment system 114. The surface treatment system is configured and operable to apply one or more surface treatments to the mold material in the mold region and may include one or more heaters 120; mold treatment device(s) 121, and a post-deposition surface finishing system 122.

The heater 120 is operable to apply temperature treatment to the mold material in the mold region to harden the mold material, and in some embodiments, may be configurable to apply the temperature treatment to the mold region after each of one or more mold deposition iterations.

In some embodiments, heater 120 may be realized as a common system that provides heating to one or more of the object construction system 126 or part thereof, a building table (not shown), and a production chamber accommodating the mold construction system 102 and object construction system at least during mold construction and object construction, respectively (not shown).

For another example, in embodiments where the mold material is in the powder form, the mold treatment device 121 may include a curing system to cure the mold using any known suitable technique, such as thermal curing, UV curing, gas curing, etc. Other mold treatments that might be suitable to be used in the mold creation may include any one of the following: microwave irradiation, UV irradiation, arc-jet, laser irradiation, ultrasonic vibration, vacuum drying, chemical agent treatment, exposure to electromagnetic field, exposure to a gaseous atmosphere, and any combination thereof.

The post-deposition surface finishing system 122 may be configured to perform e.g., mechanical surface treatment of at least a portion of the mold region, or on surfaces of the mold region facing the object region, e.g., milling, grinding and/or polishing.

It should be noted that mold post-deposition surface finishing is not limited to mechanical surface treatment. Several mold post-deposition surface treatments may be applicable to any portion of the mold region (i.e., not only to the metal-facing wall of the metal-facing zone): hardening using e.g., UV light, smoothing using e.g., laser induced melting and others, as described below with reference to FIG. 1B.

Figure 1B:
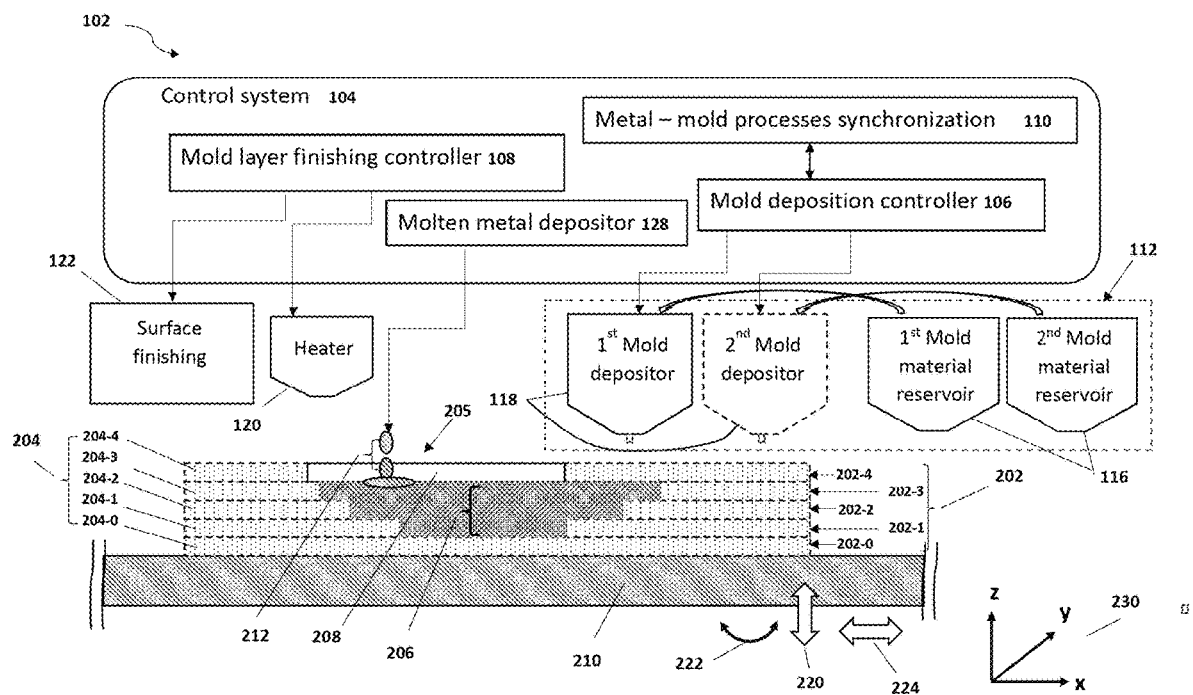
FIG. 1B more specifically exemplifies the configuration and operation of the mold construction system of embodiments of the present disclosure.

Reference is made to FIG. 1B showing more specifically the exemplary configuration and operation of the above-described mold construction system 102 according to embodiments of the present disclosure. In the figure, a cross section view of a part of an object-and-mold structure 205 is shown, which is formed by several successively produced/deposited production layers 202-0 to 202-4.

The structure 205 includes a metal object 206 within (enclosed by) its mold structure which is in the process of being additively cast on a build table 210. The build table is configured to be placed in a temperature-controlled environment (not shown here). Relative movement is provided between the build table 210 and elements of a production system (e.g., mold depositor 118 and metal deposition device which is not shown here) used for the fabrication of the production layers.

The relative movement may be provided on command from the control system 104 (or control system 124 associated with the metal deposition process) and can be realized side-to-side (in an x-direction 224), front-to-back (in a y-direction), as well as up and down (in a z-direction 220), and possibly also rotated clockwise and counterclockwise 222 with respect to a coordinate system 230. Typically, for casting large, unwieldy, and heavy objects, the displacement of the build table 210 may be limited to relative movement in the z-direction.

In some embodiments, the build table 210 is moved along the z-direction between the production layers in order to keep a working distance between the material depositor(s) and the surface of the working area. In some embodiments, the build table 210 is moved between the construction of the mold region and the production of the object region of the current production layer. In some embodiments, the x-y relative motion may be accomplished by moving the mold depositor(s) 118, the heater(s) 120, and the mechanical surface finishing unit(s) 122 while keeping the build table 210 stationary.

The additive casting of the technique of the present disclosure proceeds in accordance with a predetermined building plan of successive formation of multiple production layers (202-0 to 202-4). In the non-limiting example shown in FIG. 1B, in production layers 202-0 to 202-3 both the mold construction and the metal casting are accomplished, whereas in the current production layer (202-4) molten metal 212 is being deposited into object region 208 after the mold region 204-4 of the current production layer—defining object region 208—was fabricated. Typically, one or more bottom production layers (e.g., 202-0) are dedicated to mold material forming the lower surface for the successive production layers.

In this specific not limiting example, layers 202-0 to 202-4 include mold regions 204-0 to 204-4, wherein the bottom layer 204-0 serves as the base layer, and the successive production layers (204-1, 204-2, 204-3, and 204-4) include the mold regions defining mold cavities forming the object regions for receiving molten metal. The mold regions 204-0 to 204-4 of layers 202-0 to 202-4 are shown with dotted lines representing the interfacing surfaces between them. This is to indicate that the mold regions of the production layers were fabricated at different production cycles and are in tight contact and adhered one to another.

As also shown in the figure, the mold construction system 102 includes the control system 104, mold provision device 112 including mold material reservoirs 116 and mold depositors 118 receiving mold material from the reservoirs 116, and additional mold fabrication devices, e.g., a heater 120 and mechanical surface finishing devices 122.

The principal operation of the mold region fabrication is carried out iteratively within the current production layer, on one or more locations (single location being shown in the example of FIG. 1B), by (sequentially) providing relative displacement between the mold provision device 112 and the build table 210 and additively dispensing the mold materials to form the mold region (e.g., 204-4) under the control of the mold deposition controller 106. In some embodiments, post-deposition treatments (e.g., mold layer hardening, inner surface treatment, e.g., milling, grinding, polishing) are performed under the control of the mold layer finishing controller 108, as described above.

The casting system 100 also includes an object construction system 126, which, as shown in FIGS. 1A and 1B, includes a molten metal depositor 128. A relative displacement between the molten metal depositor and the build table 210 may be provided, e.g., the molten metal depositor may be movable. The molten metal depositor 128 may include crucibles, remote molten metal reservoirs, wire or rod stock for melting, powder for melting or combinations thereof.

It should be noted, although not specifically shown, that the object construction system 126 also includes its controller (which is a part of or operates in communication with the control system 104 of the mold construction system 102), as well as surface treatment device(s) including one or more movable heaters (performing pre-heating and post-heating of the object region). Generally, during additive casting processes, the movable units are driven for movements in the x-y plane as well as in the z direction, and have degrees of freedom in horizontal motion, vertical motion, and rotation.

Figure 2A:
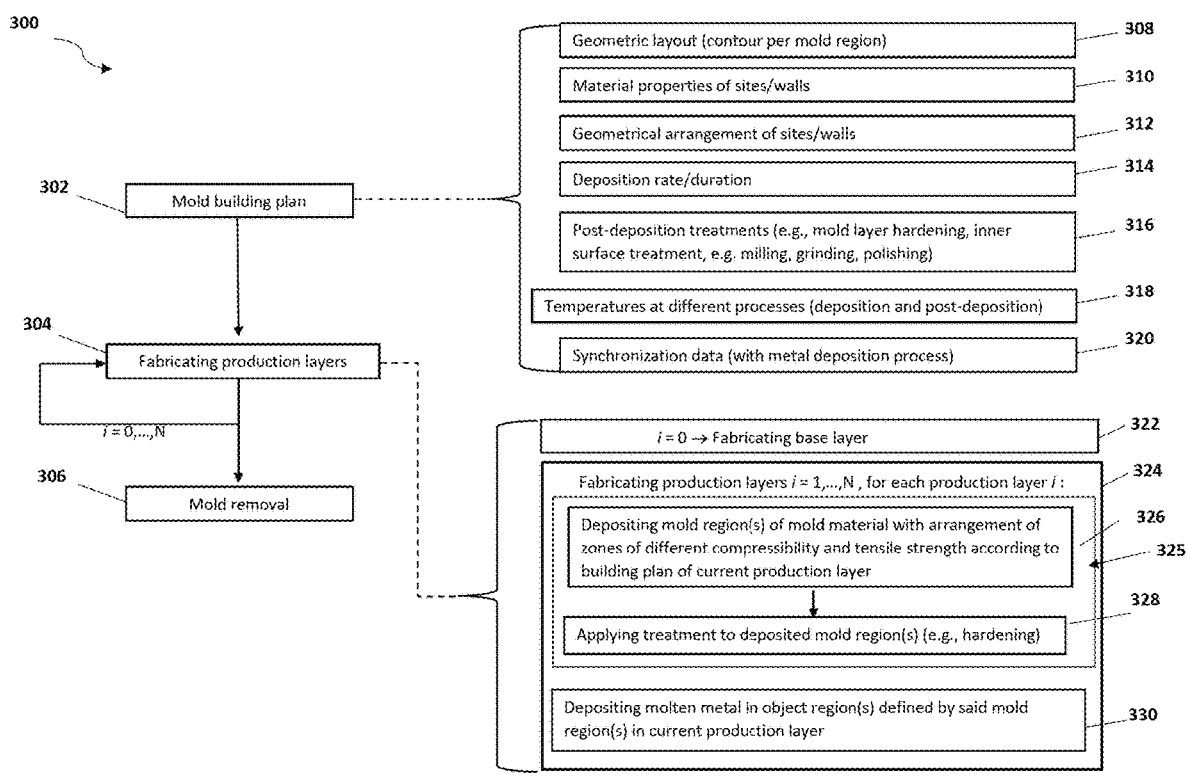
FIG. 2A schematically illustrates, by way of a flow diagram, the additive mold construction method according to embodiments of the present disclosure implemented concurrently with the additive metal object construction.

Reference is made to FIG. 2A which schematically illustrates, by way of a flow diagram 300, an additive mold construction method according to embodiments of the present disclosure providing the mold region configured as described above, i.e. comprising an arrangement of metal-facing and metal-nonadjacent zones, configured with different mechanical properties such that metal-facing zone has higher compressibility (higher ability to absorb energy of compressive stress) than at least a sub-zone of the metal non-adjacent zone. This arrangement is selected in accordance with properties of the metal object to be created and molten metal deposition used for creation of such object.

The method includes iteratively fabricating, based on mold and object building plans 302, a set of vertically stacked production layers (i=0, . . . , N) one upon another (step 304), which, once the final production layer is completed, form the entire cast mold structure surrounding the metal object. The mold structure is then removed (step 306).

The mold building plan 302 includes the necessary information/parameters to allow successive formation of multiple production layers, and for each production layer, formation of one or more mold deposition iterations in each mold region associated with a respective object region. Such mold deposition of the mold region (e.g., via iterations) may be completely performed prior to depositing the molten metal to form the respective object region of the current production layer.

In particular, the mold building plan 302 includes geometric data indicative of the geometry/shape of the metal-facing zone of the mold region 308, i.e., contour per metal-facing zone determined by the required finished surface of the metal object region; and parameters (geometrical and material parameters) of the configuration of the metal-facing and metal-con-adjacent zones as well as geometric layout of the mold region structure 312 (e.g., alignment of mold and object regions of adjacent production layers).

The material-related data 310 of the mold building plan 302 includes the properties of one or more materials used in the formation of the metal-facing and metal non-adjacent zones of each mold region (e.g., material compositions of sub-zones of these zones. For example, increasing the compressibility of the metal-facing zone of the mold region may be implemented by making the metal-facing zone (or at least one sub-zone thereof) with an arrangement of spaced-apart sites of relatively weak mechanical properties as compared to the surroundings of these sites in said zone/sub-zone. The formation of weak sites is aimed at reducing the tensile strength of the metal-facing zone of the mold region at these sites with the more compressible material, as will be exemplified further below.

Further, the mold building plan 302 includes data indicative of the mold deposition process to sequentially form multiple production layers. This data includes a number of mold deposition iterations to create the mold region of each production layer.

Typically, the building plan also includes rates and durations of the mold material deposition 314.

The building plan may also include data indicative of the temperature parameters/conditions of one or more post-deposition treatments 316. The post-deposition treatment(s) may be of the type aimed at mold hardening (e.g., by heating), surface treatment, in particular inner surface of the mold region by which it faces the object region (e.g., by milling, grinding and/or polishing).

Further typically included in the building plan is data indicative of the temperature parameters/conditions at different processes 318 (including the mold deposition process and post-deposition treatment(s)). These include, for example, the temperatures of material reservoir(s), the deposition devices, and the building table during the mold deposition, and the temperature right after the mold deposition.

It should be noted that the mold deposition and metal deposition used for creation of the mold region and object region, respectively, are successively performed during creation of each production layer and have different process parameters and timing. Therefore, the building plan includes or defines synchronization data to properly synchronize the mold deposition procedure with the metal deposition process 320, which is critical for the additive mold and object casting.

Thus, generally, the building plan data includes data indicative of two or more of the following: geometric layout of the object region(s) in each of the production layers; material, geometrical properties and arrangement of the metal-facing and metal-nonadjacent zones of each mold region in each production layer; mold deposition process parameters; surface treatment parameters and conditions of surface treatment of the mold region; and synchronization data for the mold regions and object regions formation in the production layers.

Typically, the fabrication of the production layers may start with the fabrication of a base layer (i=0) on a build table 210 (e.g., mold production layer 202-0 in FIG. 1B)—step 322. The step 324 of fabrication of each successive production layer (i=1, . . . , N) includes the mold region creation 325 which begins with depositing mold region(s) of mold material with arrangement of metal facing and metal nonadjacent zones/walls of different levels of compressibility according to the building plan of the current production layer (step 326) which may include multiple deposition-iterative procedures; and successively applying post-deposition treatment(s) to each deposited mold region (e.g., milling, polishing, hardening) (step 328). This is followed, in a synchronized manner, by the molten metal deposition in each respective object region defined by the mold region (its metal facing zone) in the current production layer (step 330).

It should be noted that in some embodiments, an additional post-treatment is used including at least partial surface finishing of the deposited mold region(s) of the production layer (step 328). This is in some embodiments performed before the mold region is cured or hardened, whereas in some other embodiments such surface finishing is performed after the mold region is hardened.

The appropriate selection of mold materials is generally done according to the suitability of the different mechanical properties of the different mold region zones to the application at hand, (e.g., matching the compressibility of the mold material to the expected thermal expansion of the metallic object material). The following is a qualitative description of relevant mechanical properties.

Figure 2B:
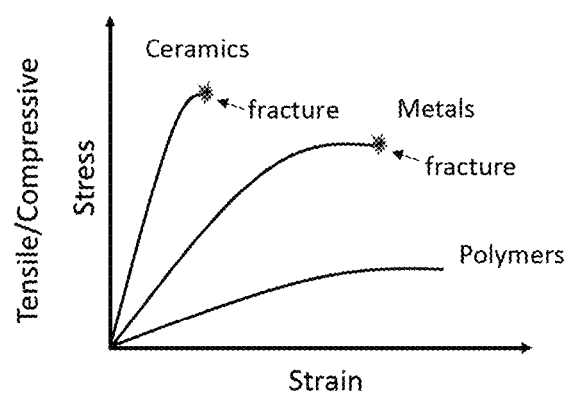
Figure 2C:
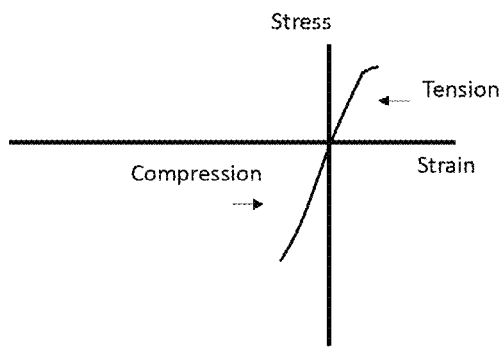

Reference is now made to FIG. 2B to 2F supporting the explanations and associated terms used herein underlying the principles of the technique of the present disclosure. FIG. 2B illustrates typical tensile/compressive stress-strain curves for three classes of materials, ceramics (typically used for mold creation), metals (used for object creation), and polymers that can be used in the mold material(s). Stress-strain curves visually display the material's deformation in response to a tensile, compressive, or torsional load. The stress strain curve for a ceramic material is almost straight line up to a yield point, both under tensile or compressive stresses, soon after which the ceramic suddenly reaches the fracture point and breaks. Metals are ductile materials, exhibiting plastic deformation (during the flattened part of the curve) before fracture, whereas ceramics exhibit negligible plastic deformation under external loading (hardly any flattened part in the stress-strain curve in FIG. 2B). This property of ceramic materials justifies their definition as brittle (opposite of ductile) materials. FIG. 2C shows a representative (qualitative) stress-strain curve of a brittle material under tensile and compressive stresses where the opposite signs of the strains under tensile/compressive stresses are clearly indicated.

Though, ceramics, being brittle materials, have compressive strengths about ten times higher than their tensile strength (strength is defined as the maximum stress in the relevant tension/compression quadrants of the stress-strain diagram). The discrepancy between tensile and compressive strengths is in part due to the brittle nature of ceramics. When subjected to a tensile load, ceramics, unlike metals, are unable to yield and relieve the stress. The tensile strength of ceramics (as well as glasses) is low because the existing flaws (internal or surface cracks) act as stress concentrators, resulting in a tendency of a material to fracture/crack with very little or no detectable plastic deformation beforehand. In compression, however, the flaws in the ceramic material do not cause stress concentrations or crack propagation, as they do in tension. For example, under a compressive load a transverse crack in a ceramic material may tend to close up and so cannot propagate.

For some embodiments, ceramics or ceramics-based materials are used as mold material during metal casting due to their ability to withstand the high temperatures of molten metals in addition to their very high modulus of elasticity (Young's modulus).

Figure 2D:
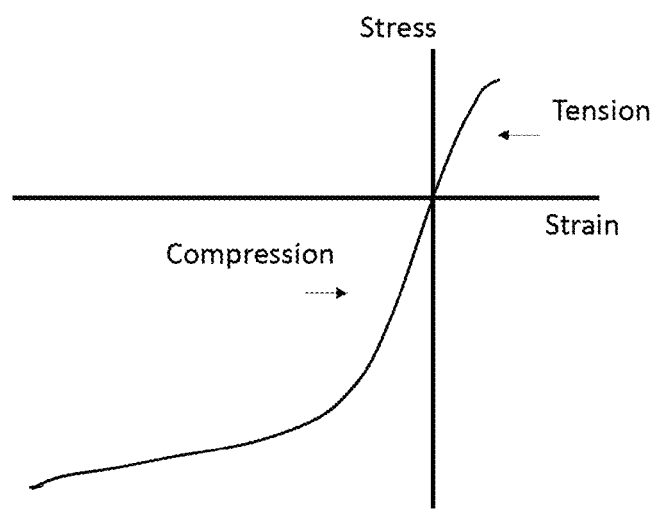

FIG. 2D shows an example of a stress-strain curve of a ceramic material which is more resistant to compressive stress (has higher toughness) than to tensile stress. This can be judged by its high compressibility under compressive stress.

The ability of a material to deform under compression (plastically or elastically) is termed compressibility. The ability of a material to absorb energy in the process before fracture is termed toughness. It should be noted that ductility is a measure of how much to something deforms plastically before fracture, but just because a material is ductile does not make it tough. The key to toughness is a good combination of strength (tensile/compressive) and ability to deform (under compression and/or tension). A material with high strength (tensile/compressive) and high ductility has higher toughness than a material with low strength and high ductility. Young's modulus measures a material's rigidity. The more rigid the material, the higher its modulus of elasticity. A material is considered to exhibit brittle fracture if its behavior is elastic virtually up to failure. Young's modulus does not depend on faults (microcracks) in the material. Toughness, on the other hand, is a measure of a material's resistance to crack propagation. Unlike mechanical strength, toughness is independent of fracture-initiating flaws (microcracks), though it depends on the microstructure of the material.

In order to be tough, a material must be both strong and ductile. Therefore, one way to measure toughness is by calculating the area under the stress strain curve from a tensile test. This value (the area under the stress strain curve) is simply called "material toughness" and it has units of energy per volume. Material toughness equates to a slow absorption of energy by the material. Toughness tends to be small for brittle materials, because elastic and plastic deformations allow materials to absorb large amounts of energy. Thus, brittle materials, when subjected to stress, break with little elastic deformation and without significant plastic deformation. Brittle materials absorb relatively little energy prior to fracture, even those of high strength.

Figure 2E:
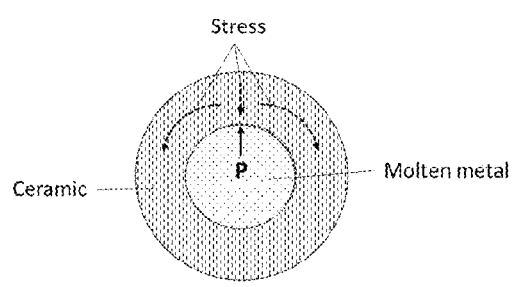

The mold fabricated according to the principles of the technique of the present disclosure (i.e., including metal-facing and metal-nonadjacent zones of different levels of compressibility, i.e., metal facing having higher compressibility) is particularly suitable for use in additive metal casting, which involves multiple iterations of molten metal deposition, as well as multiple rounds of heating portions of the solidified metal bulk prior to depositing the next metal layer. As shown in FIG. 2E, in such a process, the previously deposited molten metal unavoidably expands during heating, thereby exerting pressure P on the mold region from inside, in addition to the pressure exerted by a portion of the molten metal during casting of the successive production layer. It is important to note that in addition to the axial stresses (tensile and compressive) being developed inside the ceramic mold due to the molten metal, circumferential tensile stresses develop inside the ceramic mold all along the mold perimeter.

Figure 2F:
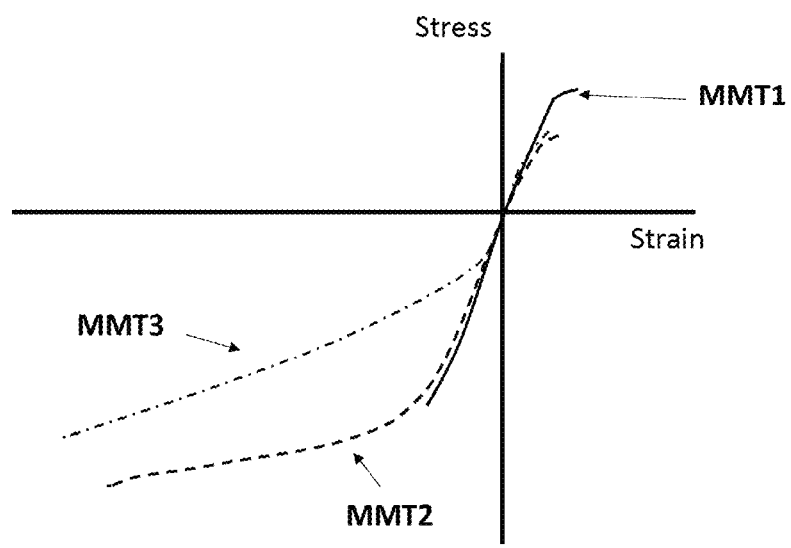

FIG. 2F shows strain-stress curves of mold material types, MMT1, MMT2, and MMT3, which differ from one another by their mechanical properties, in particular their tensile strength TS, toughness TH, and compressibility C. The first-type mold material, MMT1, is the strongest/stiffest of the three, characterized by highest tensile strength $TS_1$ and highest modulus of elasticity. It has the lowest toughness $TH_1$ and nearly zero (minimal) compressibility $C_1$ as can be judged from the lowest strain values achieved by this material under compressive stress compared to the MMT2 and MMT3 material types. The second-type mold material, MMT2, has lower tensile strength $TS_2$ as compared to material MMT1 ($TS_2<TS_1$), but higher toughness $TH_2$ as compared to MMT1 ($TH_2>TH_1$). Material MMT2 has significantly higher compressibility $C_2$ than material MMT1 ($C_2>>C_1$), and notably, MMT2 has both an elastic regime where the compressibility $C_2$ is reversible (in the linear part of the strain-stress curve) and a plastic regime where the compressibility $C_2$ is mostly irreversible. The third-type mold material, MMT3 has about the same toughness $TH_3$ as material MMT2 ($TH_3 \approx TH_2$) as judged from the similar area under the strain-stress curves. However, the compressibility $C_3$ of material MMT3 is mostly irreversible, as judged from the non-linear shape of the strain-stress curve.

The mold configured according to embodiments of the present disclosure is manufactured by an additive deposition of mold material e.g., ceramic-based material. It is configured to withstand the pressure exerted during metal casting and preserve the integrity of the mold by significantly decreasing the number and sizes of cracks that can be formed within the mold by the action of the pressure exerted by the molten metal.

The inventors understood that the materials, e.g., ceramic-based materials, suitable for manufacturing the mold region surrounding the metal object region being manufacturing are to provide a relatively high toughness, i.e., good combination of strength and flexibility/ductility, of the mold region. However, these materials should also be tolerant to very high temperatures. The additive metal casting that can be employed according to embodiments of the present disclosure uses repeated cycles of mold and metal depositions which consists of repeated cycles of abrupt temperature changes in the range of 300, 600, 1150, 1300, 1500 deg. Celsius and more for e.g., gray iron casting with ceramic-based mold paste.

Ceramic-based materials in their sintered state may be sensitive to such abrupt temperature changes and therefore their stability may be compromised before completion of the casting of the required metal object. Also, sintering process is long and requires heating to extremely high temperatures (1000-1500°). Therefore, the inventors found that using the ceramics in its green state (before sintering) is beneficial to the casting process, especially since in the green state ceramics are more flexible/ductile and able to absorb better the strain energy developed due to metal expansion during various casting stages. Yet, it is not easy to find a single ceramic material having all the required physical, mechanical and material properties. The inventors found that by using two or more different mold materials or material compositions (e.g., ceramic-based) in the mold region, while properly designing the layout/arrangement of the metal-facing and metal-nonadjacent zones of the mold region, the desired mechanical properties of the mold region and the entire mold structure in relation to the metal object can be achieved and the occurrence of destructive cracks in the mold structure can be significantly reduced.

The relatively compressible mold material may be an elastic compressible material. The shape of an elastic compressible material (in the green state) is partially or fully restored after the applied stress is removed. In other words, elastic compressible material allows a substantially reversible deformation when released from compressive stress. However, compressible material is a more general term and may describe also a material showing an irreversible deformation under compressive stress.

For ease of explanation, the different mechanical properties of different mold region zones were described with reference to different materials. It should be noted that different mechanical properties of the various mold region zones may be achieved by using e.g., a single base material applied in different manners to construct different mold zones. Porous ceramics is an example of a material that may be applied with different structures (pore size distribution, pore location distribution, etc.) giving rise to different mechanical properties. The pores may be filled by gases, e.g., air, and the material may be regarded as mostly brittle (as opposed to ductile). Under applied pressure, the pores within the ceramic material will be squeezed by the applied stress, and in the limit of the high stresses encountered during metal deposition, may eventually crack. However, porous ceramics may yet show a limited yield (more than most non-porous ceramics) allowing a limited but at times sufficient absorption of energy created by compressive stress.

The inventors examined multiple candidates for compressible materials in the mold structures of embodiments of the present disclosure including and not limited to compressible sand, ceramic-based material, compressible ceramic-based material, porous ceramics, ceramics by spraying, spheres, negative thermal expansion materials, reversibly compressible plastics, nanostructures, layered materials. As mentioned above, suitable materials are those exhibiting sufficiently high compressive strength (i.e., sustain compressive stress up to high loads) and sufficiently high compressibility relative to other materials (or other zones) in a multi-zone mold structure.

The following are various specific not-limiting examples of the configurations of the mold region according to embodiments of the present disclosure. To facilitate understanding, the same reference numbers are used to identify the same or similar components in all the examples.

In all the examples, the mold region 132 includes at least one metal-facing zone Z1 and at least one metal-nonadjacent zone Z2 surrounding the metal-facing zone Z1. Each metal-facing zone Z1 of the mold region 132 is configured to define a cavity 135 forming an object region 130 to receive the molten metal therein. The metal-facing zone Z1 of the mold region 132 is configured with higher compressibility relative to at least a sub-zone of the metal-nonadjacent zone Z2. The metal-nonadjacent zone surrounds the metal-facing zone while is either directly interfacing the metal-facing zone (e.g., being at least partially adhered to a not metal-facing side of the metal-facing zone) or spaced-apart therefrom by e.g., an air gap. Reference is made to FIGS. 3A-3B schematically illustrating an exemplary mold region 132 configuration according to embodiments of the present disclosure. FIG. 3A shows a top view of the mold region 132 and FIG. 3B shows a perspective view of the resulting mold structure 136 or a part thereof. The mold region 132 has the metal-facing and metal-nonadjacent zones Z1 and Z2. In this example, the mold region has a single metal-facing zone (this depends on the geometry/shape of the object region). Also, in this non-limiting example, the metal-facing zone Z1, as well as the metal-nonadjacent zone Z2, has a single-zone configuration. The metal-facing zone Z1 has a closed-loop configuration and defines a closed-loop cavity 135 forming the object region 130 to receive the molten metal therein. The metal-facing zone Z1 is configured with higher compressibility relative to the metal-nonadjacent zone Z2.

As exemplified in FIG. 3B, the metal-facing zone Z1 and the metal-nonadjacent zone Z2 of the mold regions of successive production layers may be of substantially constant cross-sectional geometry and dimension. The mold structure 132, formed by the successive mold regions including the mold regions of multiple successive production layers, may include a mold region of a bottom layer 202-0 which is made entirely from the mold material of the metal non-adjacent zone, e.g., MMT1, while each of the mold regions in all the production layers (e.g., 202-*i*–1, 202-*i*, 202-*i*+1) includes the metal-facing and metal-nonadjacent zones made of different material compositions having different level of compressibility as described above. For example, the mold material of the metal-nonadjacent zone Z2 may be of the material type MMT1 described above, i.e., being as strong as possible (having relatively high tensile strength). The material of the metal-facing zone Z1 is preferably of MMT2 or MMT3 type, i.e., having either reversible or irreversible compressibility.

Also, in the example of FIGS. 3A and 3B, the metal-nonadjacent zone Z2 directly interfaces the metal-facing zone. A not-metal facing side Z1*b* of the metal-facing zone Z1 may or may not be completely or partially adhered to the metal-nonadjacent zone Z2 along the respective interface.

Figure 3C:
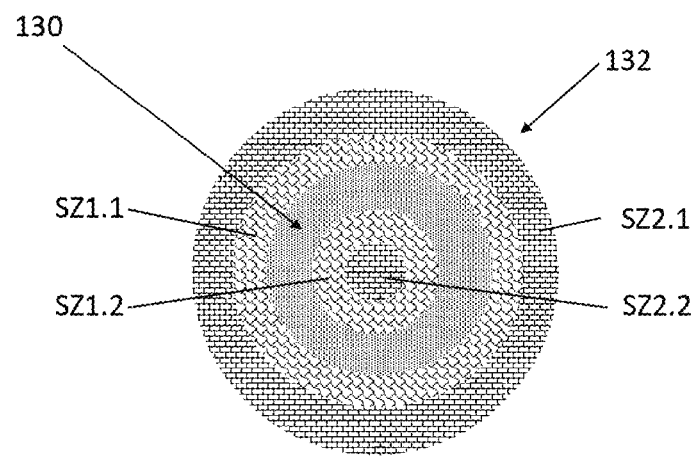
FIG. 3C shows a top view (or cross-sectional view) of an exemplary mold region, which is configured in accordance with a ring-like shape of the object region, and thus includes: two spaced-apart concentric metal-facing zones (insert zone and outsert ring-like zone) defining a cavity for the object region therebetween, and a metal-nonadjacent zone surrounding the outsert zone.

FIG. 3C exemplifies a mold region 132, which includes two metal-facing sub-zones SZ1.1 and SZ1.2, surrounded by respective metal-nonadjacent sub-zones SZ2.1 and SZ2.2. A need for such configuration of the mold region is dictated by the geometry of the object region 130. Here, the object region 130 has a ring-like geometry (corresponding to a toroidal object or part of the object). Accordingly, the mold region 132 has to define inner and outer surfaces of the cavity for such object region. The first and the second metal-facing sub-zones, SZ1.1 and SZ1.2 are closed loop zones configured to define a cavity forming the ring-shaped object region 130 to receive the molten metal therein. The metal non-adjacent sub-zone SZ2.1 surrounds the metal-facing sub-zone SZ1.1, whereas the metal non-adjacent sub-zone SZ2.2 supports the metal-facing sub-zone SZ1.2 and is deposited in an outer cavity formed by the metal-facing sub-zone SZ1.2. In this example, the metal-facing sub-zones SZ1.1 and SZ1.2 are configured with higher compressibility relative to at least one of the metal non-adjacent sub-zones SZ2.1 and SZ2.2 and are preferably made of MMT2 or MMT3 material type. The material of the metal non-adjacent sub-zones is preferably of MMT1 type.

FIG. 3D exemplifies a mold region 132 formed by the metal-facing zone Z1 of relatively high compressibility and the metal-nonadjacent zone Z2. In this example, the zones Z1 and Z2 are spaced apart from one another by an air gap AG.

Generally, an air gap between the zones Z1 and Z2 may be considered as a first sub-zone SZ2.1 of the metal-nonadjacent zone Z2 and part/wall SZ2.2 is the second sub-zone of zone Z2.

FIG. 3E exemplifies a mold region 132 including the metal-facing zone Z1 of relatively high compressibility and the metal-nonadjacent zone Z2 which includes two locally adjacent (directly interfacing) sub-zones SZ2.1 and SZ2.2 configured with different mechanical properties. In this example, the metal-facing zone Z1 and the metal-nonadjacent zone Z2 are also directly interfacing.

Considering the example of FIG. 3E, where three solid-material zones/sub-zones (i.e., zone Z1 and sub-zones SZ2.1 and SZ2.2) are used in the mold region, all these materials or material compositions can be of different mechanical properties, or that of sub-zone SZ2.2 is different from those of Z1 and SZ2.1, or material composition of SZ2.1 is different from that of Z1 and SZ2.2.

In all the above embodiments, the metal-facing zone Z1 is made of MMT2 or MMT3 material type. For example, in the configuration of FIG. 3E, the material of sub-zone SZ2.2 is preferably of MMT1 type, and sub-zone SZ2.1 is formed by a mold material having higher compressibility relative to the mold material of the metal-nonadjacent sub-zone SZ2.2, being preferably made of MMT2 or MMT3 material type.

Figure 3F:
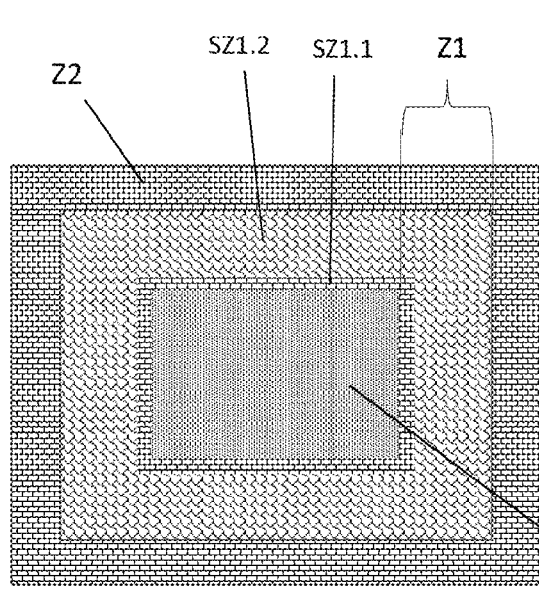
FIG. 3F exemplifies a mold region in which the metal facing zone includes a first relatively narrow sub-zone which interfaces with the object region and is surrounded by a second relatively wide sub-zone of the metal facing zone, which is in turn surrounded by the metal-nonadjacent zone.

Reference is made to FIG. 3F showing another example of the mold region 132 including the metal-facing and metal-nonadjacent zones Z1 and Z2 where the metal-facing zone includes two sub-zones SZ1.1 and SZ1.2. Here, a first narrow metal-adjacent sub-zone SZ1.1 is surrounded by a second wide outward sub-zone SZ1.2. The first metal-adjacent sub-zone SZ1.1 is relatively narrow, at least 4 times narrower as compared to the outward relatively wide compressible sub-zone SZ1.2. The compressibility of sub-zone SZ1.1 is lower compared to the compressibility of the sub-zone SZ1.2, however, the difference in the width of the metal-adjacent zones SZ1.1 and SZ1.2 is such that the total compressibility of the metal-facing zone Z1, defined by the relatively narrow metal-adjacent sub-zone SZ1.1 and the relatively wide, compressible outward sub-zone SZ1.2, provides the higher compressibility as compared to the metal-nonadjacent zone Z2.

In some implementations of the mold region configuration of FIG. 3F, the first narrow sub-zone SZ1.1 of the metal-facing zone Z1 is configured as a coating on a metal-facing side of the second sub-zone SZ1.2 which is made of a compressible ceramic-based material selected to be suitable for the molten metal. The refractory material may be compressible or non-compressible. The compressible ceramic-based material with the refractory coating is with higher compressibility comparing the metal nonadjacent zone.

In some implementations of the configuration of FIG. 3F, the coating, i.e., the narrow sub-zone SZ1.1, is aimed at smoothening the metal-facing side of the compressible material of sub-zone SZ1.2.

It should be understood that in case of multi-zone configuration of the metal-nonadjacent zone, the first sub-zone interfacing with the metal-facing zone may be of the shape conforming with the shape of the metal-facing zone, while other one or more sub-zones (at least second sub-zone) and encapsulate(s) the first sub-zone and may or may not be of the conforming shape. This is exemplified in FIGS. 3G and 3H.

Figure 3G:
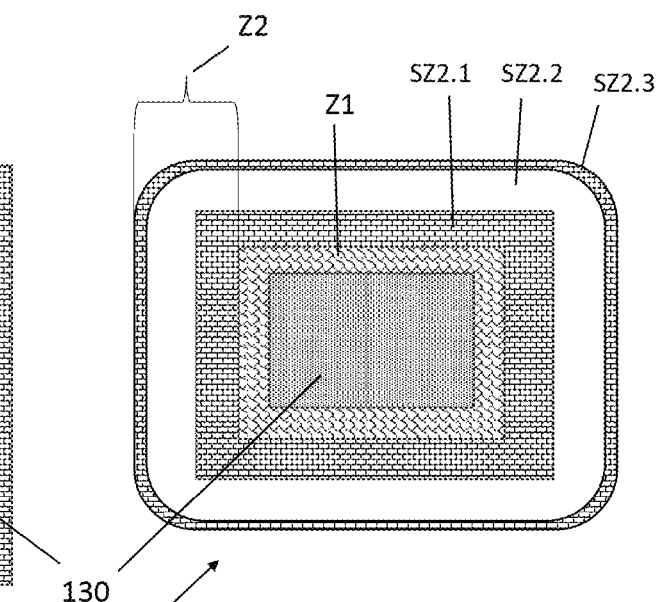
FIG. 3G exemplifies a mold region in which the first and second sub-zones of the metal-nonadjacent zones are spaced by an air gap.

FIG. 3G exemplifies a mold region 132 including metal-facing and metal-nonadjacent zones Z1 and Z2, where the metal-nonadjacent zone Z2 includes first, second and third sub-zones SZ2.1, SZ2.2 and SZ2.3. In this example, the sub-zones SZ2.1 and SZ2.3 of the metal-nonadjacent zone Z2 are spaced by an air gap SZ2.2. The first sub-zone SZ2.1 of the metal-nonadjacent zone has a shape conforming with the shape of the metal-facing zone Z1 and the third sub-zone SZ2.3 encapsulates the first sub-zone SZ2.1 while being of a somewhat different shape. The spaced sub-zones SZ2.1 and SZ2.3 of the metal-nonadjacent zone Z2 may be made of the same or different materials of MMT1 or MMT2 type.

Figure 3H:
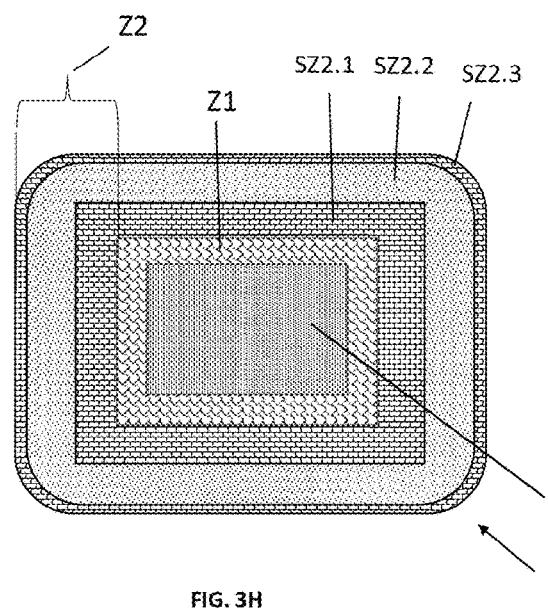
FIGS. 3H and 3L exemplify two mold regions in which the metal-nonadjacent zone includes first, second and third sub-zones, where the second sub-zone, between the first and third sub-zones, is configured as a compressive filler.

FIG. 3H exemplifies a mold region 132 including metal-facing and metal-nonadjacent zones Z1 and Z2, where the metal-nonadjacent zone Z2 includes first, second and third sub-zones, SZ2.1, SZ2.2 and SZ2.3. The second sub-zone SZ2.2, between the first and third sub-zones, is configured using a compressive filler material having higher compressibility relative to the first sub-zone SZ2.1 of the metal non-adjacent zone Z2.

Figure 3I:
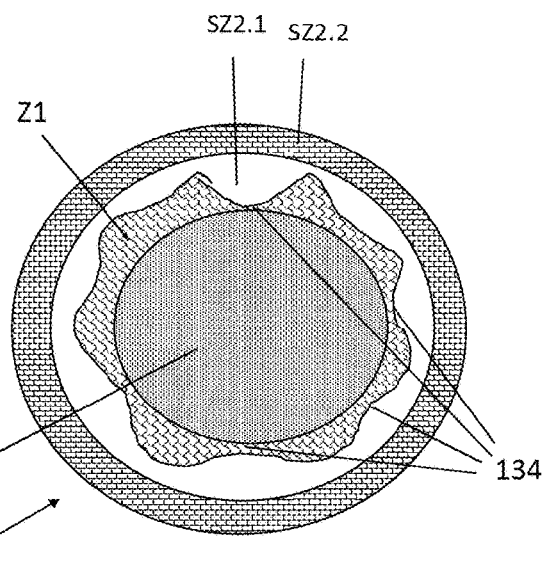
FIG. 3I exemplifies a mold region in which the metal-facing zone has varying width defining an arrangement of spaced-apart sites of relatively weak mechanical properties as compared to their surrounding within the metal-facing zone.

In some embodiments, illustrated schematically in FIG. 3I, the mold region further utilizes provision, in at least the metal-facing zone Z1, of arrangement of spaced-apart sites 134 of relatively weak mechanical properties as compared to the mold material in the surrounding of said sites within the respective zone/sub-zone. This provides for even better resistance of the mold region, and thus the entire mold structure, to severe cracking.

It should be noted that configuring the metal-facing zone or a first sub-zone of the metal-nonadjacent zone with the arrangement of spaced-apart sites of relatively weak mechanical properties can be implemented in various ways, e.g. by one or more of the following: creating spaces/notches in the respective wall(s)/zone(s), bubbles/pores formation in the wall(s), variable thickness of the wall(s), sites of different density of the mold material, and sites produced by a different material composition of the respective wall(s). The different density of mold material being deposited in the selected sites may be achieved by controllably varying the duration of deposition, rate of deposition, and/or amount of mold material. Furthermore, at least one of the compositions of the mold material, concentration of the material, mechanical and rheological properties of the mold material may be varied, while using the same deposition method.

FIG. 3I exemplifies a mold region 132 including metal-facing and metal-nonadjacent zones Z1 and Z2 in which the metal-facing zone Z1 is configured with an arrangement of spaced-apart sites of relatively weak mechanical properties as compared to their surroundings in the metal-facing zone. In this example, this is implemented by configuring the metal-facing zone with a varying width along a perimeter thereof (e.g., providing a surface relief at the outer surface of the metal-facing zone). The varying width defines the arrangement of spaced-apart sites of relatively weak mechanical properties at the relatively thin sites of the metal facing zone as compared to their surrounding within the metal-facing zone. In this non-limiting example, similar to the mold structure of FIG. 3D, the metal-nonadjacent zone Z2 is composed of two sub-zones—sub-zone SZ2.2 spaced apart from the metal-facing zone Z1 by the other sub-zone being in the form of an air gap SZ2.1.

The metal-facing zone with the arrangement of spaced-apart sites of relatively weak mechanical properties provides better resistance of the mold region to pressures exerted by the expanding metal.

Figure 3J:
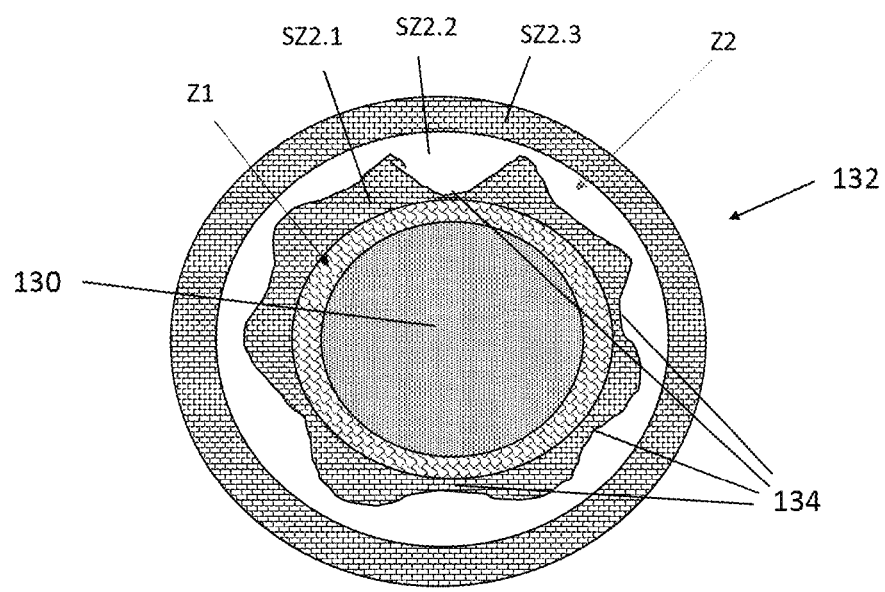
FIG. 3J exemplifies a mold region in which a first sub-zone of the metal nonadjacent zone (facing the metal-facing zone) has a varying width similar to that of FIG. 3I, defining an arrangement of spaced-apart sites of relatively weak mechanical properties as compared to their surrounding within the metal-facing zone.

FIG. 3J exemplifies a mold region 132 configured generally similar to that of FIG. 3I, i.e., has an arrangement of spaced-apart sites of relatively weak mechanical properties (e.g. implemented by varying width of the zone/sub-zone). Here, the mold region portion containing the arrangement of such sites may be a relatively wide metal-facing zone Z1. In this configuration, the relatively compressible metal-facing zone Z1 can respond with compression to the outward pressure exerted by the expanding/molten metal, thereby absorbing a large part of the energy, and the arrangement of relatively weak sites creates "breathing/weak points" along the perimeter capable to relieve the remaining stresses. Also, in this non-limiting example, an air gap SZ2.2 is provided being considered as either between the metal-facing zone Z1 and metal-nonadjacent zone Z2 or as a sub-zone of the metal-nonadjacent zone Z2.

Figure 3K:
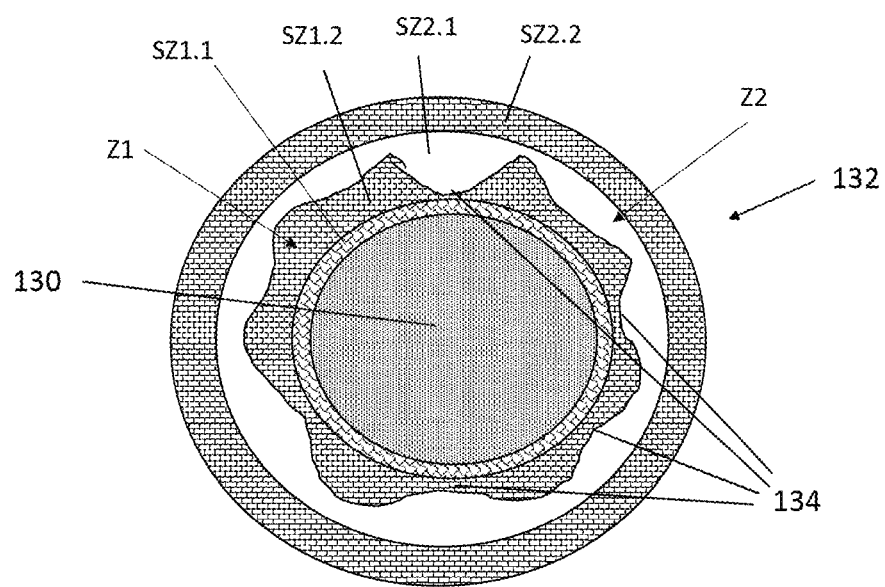
FIG. 3K exemplifies a mold region in which the metal-facing zone includes a first relatively narrow sub-zone (similar to FIG. 3F) which is surrounded by a second sub-zone of the metal-facing zone having a varying width defining an arrangement of spaced-apart sites of relatively weak mechanical properties (similar to FIGS. 3I and 3J)

FIG. 3K exemplifies a mold region 132 in which the metal-facing zone Z1 has two sub-zones including sub-zone SZ1.1 which is realized as a coating on the metal-facing side of the other sub-zone SZ1.2 (similar to the example of FIG. 3F), and the sub-zone SZ1.2 is configured with the arrangement of relatively weak sites (creating "breathing/weak points" as described above). Also, in this configuration, the metal-nonadjacent zone Z2 is in the form of two sub-zones—sub-zone SZ2.1 being an air gap between the metal-facing zone Z1 and the second sub-zone SZ2.2 of the metal-non-adjacent zoner Z2.

Figure 3L:
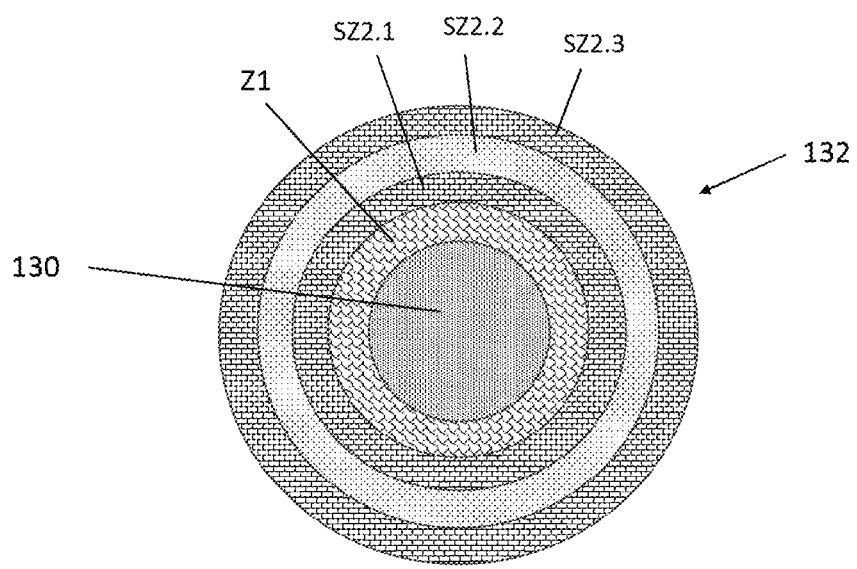

FIG. 3L exemplifies a mold region 132 including the metal-facing and metal-nonadjacent zones Z1 and Z2 wherein the metal-nonadjacent zone Z2 is composed of three adjacent sub-zones SZ2.1, SZ2.2 and SZ2.3 of different mechanical properties. This can be implemented by depositing ceramic-based material(s) as first wall and second walls forming the first sub-zone SZ2.1 and the third sub-zone SZ2.3 and filling a gap between them with a filler material having higher compressibility relative to that of the at least first sub-zone SZ2.1 of the metal-nonadjacent zone Z2. This filler material forms the second sub-zone SZ2.2 of the metal-nonadjacent zone. The inventors have found that filling the space between the two retaining walls (sub-zones) SZ2.1 and SZ2.3 of the mold with a compressible filler may be favorable to prevent metal breaching by combining the ability of the compressible filler to absorb the outward pressure exerted by the expanding/molten metal before tensile failure of the mold occurs, whereas a strong outer mold wall (SZ2.3) may provide the necessary support for the compressible filler during compression.

Figure 4:
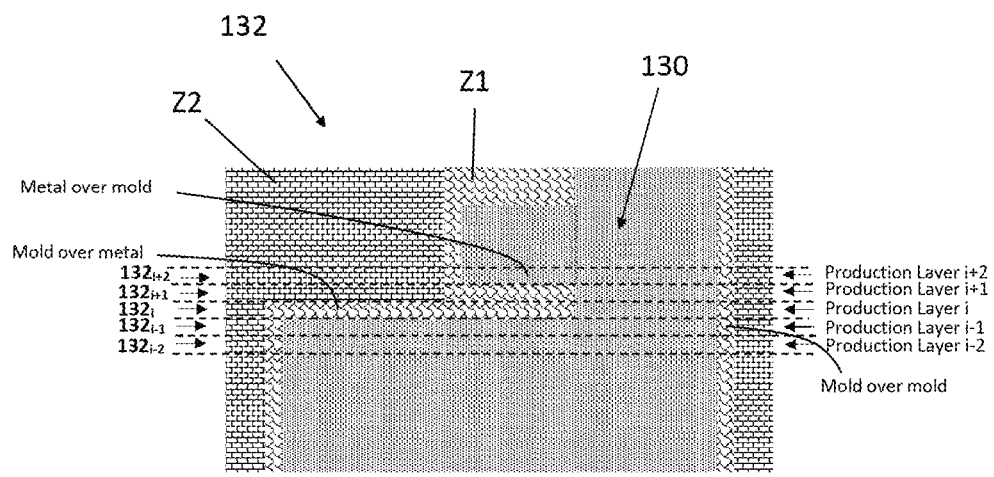
FIG. 4 shows a portion of a production part comprising a stack of production layers exemplifying that, depending on a surface relief of the metal object region being manufactured, the mold region of a current production layer is not necessarily completely aligned with a mold region of a preceding layer, but rather may be located on top of at least a part of the mold region of the preceding production layer or on top of at least a part of an object region of the preceding production layer.

Reference is made to FIG. 4 showing a cross section of a mold structure comprising several mold regions 132 and object regions 130 in multiple production layers—five production layers, (i−2), (i−1), i, (i+1), and (i+2) being shown in the figure. The mold regions of all the production layers comprise a metal-facing zone Z1 and a metal non-adjacent zone Z2. In this example, the metal object has a certain surface relief along its outer surface resulting in different alignments between the mold regions of different production layers.

As exemplified with respect to productions layers (i−2) and (i−1), the respective mold regions $132_{i-1}$ and $132_{i-2}$ are completely vertically aligned, such that both the metal-facing zones $Z1_{i-1}$ and the metal non-adjacent zone Z2 of the mold region $132_{i-1}$ are deposited on top of the respective $Z1_{i-1}$ and $Z2_{i-2}$ zones of the mold region $132_{i-2}$ of the preceding production layer (i−2). In the production layer i, due to a change in the surface profile of the object region and accordingly of the shape of the metal-facing zone $Z1_i$ of mold region $132_i$, the mold material of the metal-facing zone $Z1_i$ is deposited over/aligned with the deposited metal (part of object region) of the preceding production layer (i−1), as was dictated by the narrower profile of the metal object in the building plan. Notably, the metal deposition of production layer (i+2) was performed, partially, over the mold material deposited during the construction of mold region of layer (i+1). Thus, in production layer i, a part segment of the mold region $132i$ is a so-called "mold over metal" part, and a part of the object region $130_{i+2}$ in production layer (i+2) is a so-called "metal over mold" part.

Consequently, in the "metal over mold" production scenario, surface treatment, if applied to the metal facing zone, may be performed on the inner walls of the cavity formed by the mold region in production layer i. The surface treatment may further be applied to the upper surface of the mold region, to thereby define a cavity forming the metal object region that would be deposited in the successive production layer i+1.

In the "metal over mold" production scenario, the metal-facing zone of production layer i may face metal residing in the previous production layer—production layer i−1. The temperature of the metal region in production layer i−1 may be higher than the temperature of sections of the mold region in production layer i−1. Consequently, different sections of mold region in production layer i may experience different temperatures upon deposition, which, in turn, influence the mechanical properties of the mold section and of the mold region.

As described above, the configuration of the mold regions, as well as relative accommodation of the mold regions of adjacent production layers are defined by the configuration of the object to be manufactured concurrently with the mold structure. For simplicity of illustration, the configuration of the mold region as a two-zone configuration where the metal-facing zone has higher compressibility relative to the non-adjacent zone, was illustrated with simplified designs such as a circular or ring cross sections. In such illustrations—for example, as illustrated in FIGS. 3A-3K, the metal-facing zone faces metal residing in the same production layer. However, as is evident from FIG. 4, in some production scenarios, the metal-facing zone of production layer i may face metal residing in the previously produced production layer—production layer i−1 (the 'metal over mold' production scenario); in other production scenarios, the metal-facing zone of production layer i may face metal residing in the next production layer—production layer i+1 (the 'mold over metal production scenario). As used throughout the specification, the terms "metal" or "metallic" refers to any metals and/or mellitic alloys which are suitable for melting and casting, for example, ferrous alloys, aluminum alloys, copper alloys, nickel alloys, magnesium alloys, and the like.

Any reference in the specification to a method should be applied mutatis mutandis to a system capable of executing the method and should be applied mutatis mutandis to a non-transitory computer-readable medium that stores instructions that, once executed by a computer, result in the execution of the method. Any reference in the specification to a system should be applied mutatis mutandis to a method that may be executed by the system and should be applied mutatis mutandis to a non-transitory computer-readable medium that stores instructions that may be executed by the system.

The terms "front," "back," "top," "bottom," "over," "under", and the like in the description and in the claims, if any, are used for descriptive purposes and not necessarily for describing permanent relative positions. It is understood that the terms so used are interchangeable under appropriate circumstances such that the embodiments of the present disclosure described herein are, for example, capable of operation in other orientations than those illustrated or otherwise described herein.

The subject matter regarded as the technique of the present disclosure is particularly pointed out and distinctly claimed in the concluding portion of the specification. The technique of the present disclosure, however, both as to organization and method of operation, together with objects, features, and advantages thereof, may best be understood by reference to the detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the claims, any reference signs placed between parentheses shall not be construed as limiting the claim. The word 'comprising' does not exclude the presence of other elements or operations and stages than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the technique of the present disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the present disclosure.

The invention claimed is:

1. A mold construction system for use in additive manufacturing of a metal object using an additive process of layer-by-layer formation of a stack of production layers, each production layer comprising at least one object region associated with at least one mold region, and formation of each production layer comprises forming the at least one mold region and depositing molten metal therein prior to forming a subsequent production layer, the mold construction system comprising:

a mold provision device configured to create, in each of the production layers, the at least one mold region defining a cavity of a respective object region for receiving molten metal being deposited to said object region by one or more molten metal depositors; and a control system configured to operate said mold provision device in accordance with a predetermined building plan, wherein:

said mold provision device comprises mold material reservoirs and mold depositors configured to operate, in accordance with said predetermined building plan, to deposit mold material compositions and create the mold region in the production layer comprising a lateral arrangement of different zones being differently spaced from the respective object region and having different compressibility properties, said lateral arrangement of the different zones of the mold region comprises a metal-facing zone and one or more metal-nonadjacent zones around said metal-facing zone, wherein the metal-facing zone is configured to define the cavity forming said respective object region to receive the molten metal therein, wherein each of the one or more metal-nonadjacent zones is separated from the cavity by said metal-facing zone, and said metal-facing zone is configured with higher compressibility relative to at least a first sub-zone of the said one or more metal-nonadjacent zones by which said one or more metal-nonadjacent zones face said metal-facing zone.

2. The system according to claim 1, wherein the control system is configured to operate the mold provision device in accordance with the building plan which is indicative of two or more of the following: geometric layout of the at least one object region in each of the production layers; material, geometrical properties and arrangement of the metal-facing and metal-nonadjacent zones of each mold region in each of the production layers; mold deposition process parameters; surface treatment parameters and conditions of surface treatment of the mold region; synchronization data for formation of mold and object regions in each of the production layers.

3. The system according to claim 1, wherein the metal-nonadjacent zone of the mold region is configured with higher tensile strength relative to the metal-facing zone of said mold region.

4. The system according to claim 1, wherein the metal-facing zone and the metal-nonadjacent zone of the mold region comprise, respectively, first and second different mold material compositions.

5. The system according to claim 1, wherein the metal-facing zone is configured as an inner wall made of a refractory compressible ceramic-based material selected to be suitable for said molten metal.

6. The system according to claim 1, wherein the metal-nonadjacent zone is composed of ceramic-based material.

7. The system according to claim 1, wherein the metal-facing zone comprises a first metal-adjacent sub-zone surrounded by a second outward sub-zone, said first metal-adjacent sub-zone being relatively narrow, at least by a factor of four, as compared to the second outward sub-zone being relatively wide, such that compressibility of the metal-facing zone formed by the relatively narrow metal-adjacent sub-zone and the relatively wide, compressible outward sub-zone provides said higher compressibility of the metal-facing zone as compared to the at least said first sub-zone of the metal-nonadjacent zone.

8. The system according to claim 7, wherein the second outward sub-zone of the metal-facing zone is composed of a compressible ceramic-based material, said first narrow sub-zone of the metal-facing zone being configured as a coating on a metal-facing side of the second outward sub-zone.

9. The system according to claim 1, wherein said mold provision device is configured to provide the mold region having one of the following configurations: the metal-facing zone, by a non-metal facing side thereof, is at least partially adhered to the metal-nonadjacent zone; and the metal-facing zone and the metal-nonadjacent zone are spaced from one another by an air gap.

10. The system according to claim 1, wherein the mold region comprises the metal-nonadjacent zone comprising said first sub-zone surrounded by at least a second sub-zone having different mechanical properties as compared to the first sub-zone of the metal-nonadjacent zone.

11. The system according to claim 10, wherein the metal-nonadjacent zone is composed of a ceramic-based material deposited as a first wall and at least a second wall forming said first and said at least second sub-zones, respectively.

12. The system according to claim 10, wherein the first sub-zone of the metal-nonadjacent zone has a shape conforming with a shape of the metal-facing zone, and said at least second sub-zone encapsulates the first sub-zone.

13. The system according to claim 10, wherein the mold region has one of the following configurations:
(a) the first sub-zone of the metal-nonadjacent zone interfaces with the metal-facing zone and is made of a filler material having higher compressibility relative to the at least second sub-zone of the metal-nonadjacent zone;
(b) the first and the at least second sub-zones of the metal-nonadjacent zone are spaced by an air gap between them;
(c) the metal-nonadjacent zone comprises said first and second sub-zones, and a third sub-zone enclosing the second sub-zone, wherein the second sub-zone between the first and third sub-zones is configured as a filler material having higher compressibility relative to the first sub-zone of the metal-nonadjacent zone.

14. The system according to claim 10, wherein the mold material composition of the metal-facing zone and at least one sub-zone of the one or more metal-nonadjacent zones is configured as one or more of the following: compressible sand, ceramic-based material, compressible ceramic-based material, porous ceramics, ceramics by spraying, spheres, negative thermal expansion materials, reversibly compressible plastics, nanostructures, layered materials.

15. The system according to claim 1, wherein said metal-facing zone and said metal-nonadjacent zone are spaced from one another by an air gap, such that the metal-nonadjacent zone is separated from the cavity by a distance defined by a lateral size of the metal-facing zone and a lateral size of the air gap, and wherein the metal-facing zone is formed with an arrangement of spaced-apart sites of relatively weak mechanical strength as compared to their surroundings within said metal-facing zone.

16. The system according to claim 15, wherein the metal-facing zone has a varying lateral size along a perimeter thereof to thereby provide a predetermined variation of a mechanical property of said metal-facing zone along its perimeter and define said arrangement of the spaced-apart sites of relatively weak mechanical strength.

17. The system according to claim 10, wherein the first and at least second sub-zones of the metal-nonadjacent zone are spaced by an air gap between them, the first sub-zone of the metal-nonadjacent zone having a varying lateral size along a perimeter thereof to thereby provide a predetermined variation of the mechanical property of said first sub-zone to thereby define in said first sub-zone an arrangement of spaced-apart sites of relatively weak mechanical strength as compared to their surroundings within said first sub-zone.

18. The system according to claim 7, wherein the second outward sub-zone of the metal-facing zone has a varying lateral size along a perimeter thereof to thereby provide a predetermined variation of a mechanical property of said second sub-zone to thereby define in said second sub-zone an arrangement of spaced-apart sites of relatively weak mechanical strength as compared to their surroundings within said first sub-zone.

19. The system according to claim 18, wherein the metal-nonadjacent zone comprises first and second sub-zones, where said first sub-zone interfacing with a non-metal facing side of the metal-facing zone is an air gap.

20. The system according to claim 1, wherein said mold provision device is configured to create the mold region using one or more mold material provision iterations.

21. The system according to claim 1, wherein the mold depositors of said mold provision device comprises one or more traveling mold depositors, each traveling in a horizontal plane according to a predetermined trajectory and being associated with one or more of the mold material reservoirs.

22. The system according to claim 21, wherein said mold provision device is characterized by one of the following:
(1) comprises one or more extruders each in fluid communication with said one or more traveling depositors; and
(2) each of said one or more traveling depositors comprises at least one of the following: stirrers, tubing, and tubing loop configured to perform continuous circulation of the mold material not currently involved in deposition process.

23. The system according to claim 1, wherein the mold provision device comprises a mold powder dispenser to provide the mold material in a powder form and a binder jetting dispenser for dispensing one or more binding agents in selected locations.

24. The system according to claim 23, wherein the mold construction system further comprises a powder removal device for removing the mold powder from locations outside the selected locations.

25. The system according to claim 1, further comprising a surface treatment system configured to apply one or more surface treatments to the mold material in the mold region comprising one or more of the following:
apply temperature treatment to the mold material in the mold region to harden said mold material;
perform mechanical surface treatment of at least a metal-facing side of the metal-facing zone of the mold region;
perform one or more of surface hardening and smoothing processes.

26. The system according to claim 1, wherein said mold provision device is configured to create the mold region using one or more mold material provision iterations, the system comprising a surface treatment system being configured to apply temperature treatment to the mold material in the mold region to harden said mold material after each of said one or more mold provision iterations.

27. The system according to claim 1, configured to create the mold region of a current production layer on top of either at least a part of a preceding mold region of a preceding production layer or on at least a part of a preceding object region of the preceding production layer, depending on a surface relief of the metal object region being manufactured.

28. An additive casting system for additively casting of a metallic object by producing multiple production layers having mold regions and object regions within cavities defined by the mold regions, one current production layer after the other on a movable build table up to a top production layer, the system comprising:
the mold construction system of claim 1, and
an object construction device configured to construct each current production layer by depositing molten metal in each of one or more object regions defined by each of the respective one or more mold regions in said current production layer.

29. A method for use in additive manufacturing of a metal object, the method comprising:
providing the additive casting system of claim 28;
operating said additive casting system for constructing successive production layers, each including a number of mold regions associated with a respective number of object regions, wherein the constructing of each production layer is controllably performed in accordance with a predetermined building plan, by carrying out the following:
for each production layer, prior to deposition of molten metal material in the number of object regions, creating said number of mold regions, by depositing a mold material in said number of mold regions while varying one or more of mold material deposition parameters and conditions, to construct each mold region comprising one or more metal-facing zones, configured to define a cavity forming the object region to receive the molten metal therein, and one or more metal-nonadjacent zones surrounding said one or more metal-facing zones, wherein said metal-facing zone has higher compressibility relative to the metal-nonadjacent zone.

* * * * *